(12) United States Patent
Thimmanaik et al.

(10) Patent No.: US 12,253,849 B2
(45) Date of Patent: Mar. 18, 2025

(54) REAL-TIME ANOMALY DETECTION FOR INDUSTRIAL PROCESSES

(71) Applicant: Intel Corporation, Santa Clara, CA (US)

(72) Inventors: Tara K. Thimmanaik, Vancouver, WA (US); Rita Chattopadhyay, Chandler, AZ (US); David J. Austin, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 347 days.

(21) Appl. No.: 17/523,559

(22) Filed: Nov. 10, 2021

(65) Prior Publication Data

US 2022/0066435 A1 Mar. 3, 2022

Related U.S. Application Data

(60) Provisional application No. 63/273,812, filed on Oct. 29, 2021, provisional application No. 63/198,750, filed on Nov. 10, 2020.

(51) Int. Cl.
*G05B 23/02* (2006.01)
*G06T 7/00* (2017.01)

(52) U.S. Cl.
CPC ..... *G05B 23/0281* (2013.01); *G05B 23/0294* (2013.01); *G06T 7/0006* (2013.01); *G06T 2207/30136* (2013.01)

(58) Field of Classification Search
CPC ............ G05B 23/0281; G05B 23/0294; G06T 7/0006; G06T 2207/30136
USPC ........................................................ 702/183
See application file for complete search history.

(56) References Cited

U.S. PATENT DOCUMENTS

| | | | |
|---|---|---|---|
| 10,024,735 B2 * | 7/2018 | Ignatowski ............ | G01K 13/00 |
| 2016/0260261 A1 * | 9/2016 | Hsu .......................... | B23K 9/32 |
| 2018/0130376 A1 * | 5/2018 | Meess ...................... | G09B 5/06 |
| 2020/0046059 A1 * | 2/2020 | Hsu .......................... | G06T 1/20 |

OTHER PUBLICATIONS

Scrime, Luke et al., "Anomaly detection and classification in a laser powder bed additive manufacturing process using a trained computer vision algorithm," Additive Manufacturing 19, 2018, pp. 114-126, Elsevier B.V., Pittsburgh, PA.

* cited by examiner

*Primary Examiner* — Aditya S Bhat
(74) *Attorney, Agent, or Firm* — Alliance IP, LLC

(57) ABSTRACT

In one embodiment, a device comprises interface circuitry and processing circuitry. The processing circuitry receives, via the interface circuitry, a video stream captured by a camera during performance of an industrial process, wherein the video stream comprises a sequence of frames; detects, based on analyzing the sequence of frames, a degree of particle scatter that occurs during performance of the industrial process; and determines, based on the degree of particle scatter, that an anomaly occurs during performance of the industrial process.

21 Claims, 16 Drawing Sheets

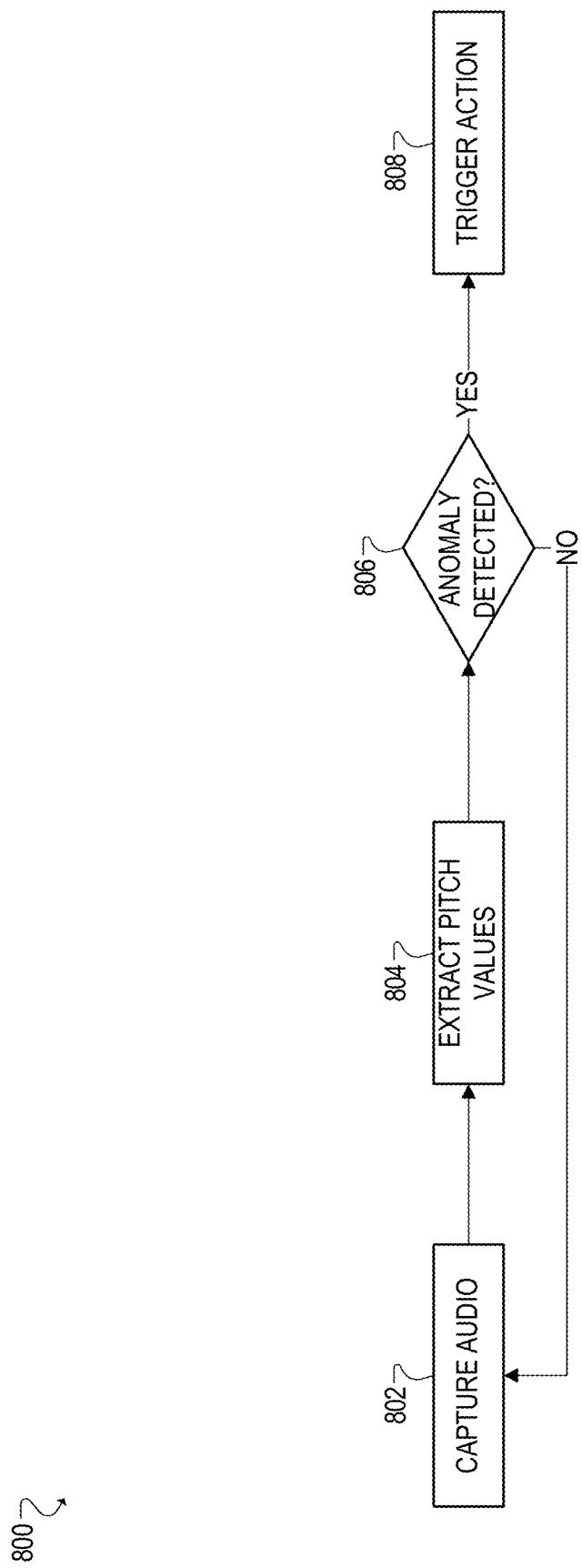

REAL-TIME ANOMALY DETECTION FOR INDUSTRIAL PROCESSES

CROSS-REFERENCE TO RELATED APPLICATIONS

This patent application claims the benefit of the filing date of U.S. Provisional Patent Application Ser. No. 63/198,750, filed on Nov. 10, 2020, and entitled "REAL-TIME ANOMALY DETECTION FOR INDUSTRIAL PROCESSES USING AUDIO AND VIDEO," and further claims the benefit of the filing date of U.S. Provisional Patent Application Ser. No. 63/273,812, filed on Oct. 29, 2021, and entitled "REAL-TIME ANOMALY DETECTION FOR INDUSTRIAL PROCESSES USING AUDIO AND VIDEO," the contents of which are hereby expressly incorporated by reference.

TECHNICAL FIELD

This disclosure relates in general to the field of industrial automation, and more particularly, though not exclusively, to real-time anomaly detection for industrial processes using audio and/or video data.

BACKGROUND

Quality control for high-volume manufacturing is a very challenging business problem that has traditionally been performed manually. Due to the large scale of production, however, it is impractical to manually inspect every aspect of every manufactured product. As a result, manual quality control inspections are typically performed on a limited sample of the production output. In an automotive factory, for example, a vehicle may be randomly selected from the production line each day and various aspects of its production quality may be manually inspected, such as the weld quality for a representative set of welding spots on the vehicle. This sampling method of quality control is costly and labor intensive, however, and its efficacy is extremely limited, as it leaves many unanswered about the production quality of the remaining welds and vehicles that are not inspected each day.

Moreover, there are various challenges associated with attempts to automate quality control for high-volume manufacturing. For example, automated quality control solutions can be tedious to develop and scale and they often suffer from poor performance.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIG. 8 illustrates an example process flow for unsupervised weld porosity detection based on audio captured during a weld.

EMBODIMENTS OF THE DISCLOSURE

Figure 1:
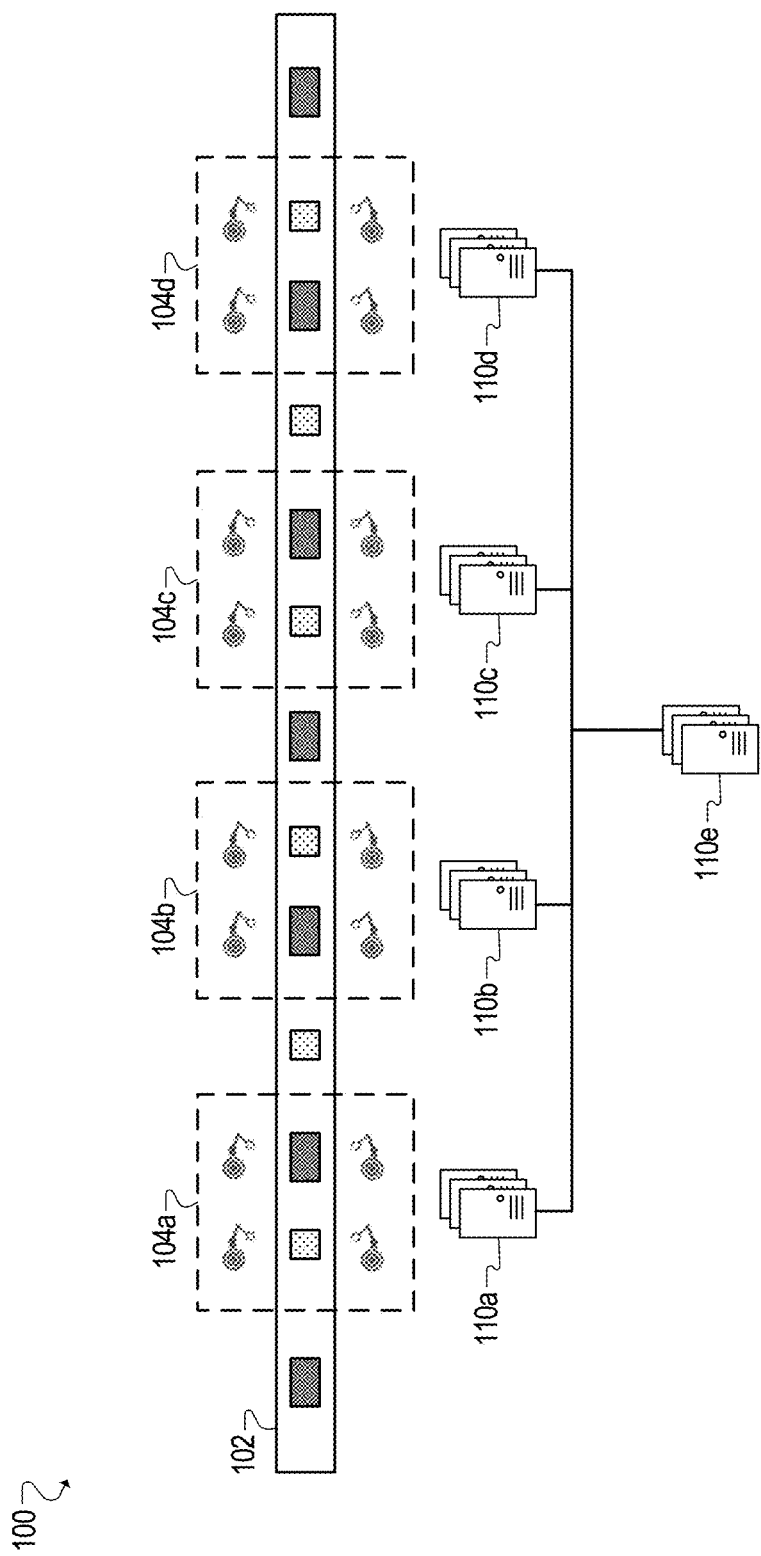
FIG. 1 illustrates an example of a manufacturing environment that leverages real-time anomaly detection for industrial processes in accordance with certain embodiments.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Real-Time Anomaly Detection for Industrial Processes

The adoption of artificial intelligence (AI) and machine learning (ML) in the industrial landscape is no longer just a concept—real-life deployments are now being used to solve actual business problems, and the Information Technology (IT) and Operational Technology (OT) spaces are rapidly converging. For example, predictive analytics using AI and ML can be leveraged for a variety of use cases in industrial settings, which generally involve predicting some type of event or circumstance based on patterns of data captured in the past versus in real time.

As an example, quality control for high-volume product manufacturing is a very challenging business problem that has traditionally been performed manually. With respect to automobile manufacturing, for example, an automotive factory may have hundreds or thousands of autonomous robots throughout its production line. Each robot is typically equipped with a tool of some kind—such as a welding gun, glue gun, riveting machine, pump, or screwdriver—which the robot uses to perform a specific task required to assemble an automobile (e.g., based on specific reference parameters that control how the task is to be performed). For example, many of the robots (e.g., hundreds or even thousands) may use a welding gun to perform spot welds to weld pieces of metal together, such as to assemble the chassis of a vehicle. For a large factory that produces hundreds or even thousands of vehicles per day—with thousands of welds required per vehicle—millions of welds can be performed in a single day of production. For example, assuming a production rate of 1,000 vehicles per day with 5,000 welds required per vehicle, 5,000,000 welds are performed each day.

Due to the large scale of production (e.g., the number of welds performed per vehicle and the volume of vehicles produced per day), it is impractical to manually inspect every weld on every vehicle. Thus, to ensure the quality of the welds, factory engineers and operators typically perform manual quality control inspections on a very limited sample of welding spots and production vehicles. For example, quality control is traditionally performed using a sampling method, where a random vehicle is selected from the production line each day and various aspects of its production quality are evaluated by factory engineers, such as the weld quality for a representative set of welding spots on the vehicle. This sampling method of quality control is costly and labor intensive, however, and its efficacy is extremely limited, as it leaves many unanswered about the production quality of the remaining welds and vehicles that are not inspected each day.

Predictive analytics could potentially be leveraged to automate quality control on the production line, such that defects and anomalies that occur during product manufacturing are detected in real time based on data generated by equipment on the manufacturing floor (e.g., machines, robots, tools, sensors). There are various challenges associated with the use of predictive analytics for quality control, however, as the predictive models can be tedious to develop and scale and often suffer from poor performance.

For example, in a large-scale industrial environment, training a model using AI/ML typically requires data from a large number of machines to be collected, cleaned, and manually labeled with a ground truth indication of quality for the manufacturing task or part associated with each data sample (e.g., good weld vs. bad weld). This manual training process—commonly referred to as supervised learning—can be very tedious and may become impractical or altogether infeasible as the complexity of the environment grows (e.g., the production volume, the number of machines/robots on the production line, the number of tasks performed and parts produced during the manufacturing process, and the number of predictive models that must be trained to perform quality control for those various tasks and parts).

Moreover, it can be challenging to develop and train predictive models that can accurately detect anomalies for certain types of manufacturing tasks, such as welding. As a result, predictive models trained for anomaly detection often yield poor performance for those manufacturing tasks.

For example, as noted above, it is common practice to employ robotic welding for high-volume production applications, such as automotive manufacturing. The most common form of robotic welding is gas metal arc welding (GMAW), which uses an electric arc formed by a wire electrode to heat and melt metals—while simultaneously supplying a shielding gas to shield the molten metal from atmospheric contamination—which ultimately causes the metals to bind together when cooled.

This welding technique, however, is susceptible to various problems that can negatively impact the quality of a weld. One of the most prevalent problems is weld porosity, which occurs when a weld is contaminated by gases that become trapped within the molten metal. Weld porosity decreases the bonding strength of a weld, which may lead to a weak and faulty weld that results in a product defect, thus requiring the weld to be reworked or scrapped. Moreover, in some cases, product defects from weld porosity can lead to a significant percentage of the production output being rejected during final inspection of the products (e.g., 25% or more of the production output), which causes lengthy production delays and substantial loss of revenue.

Moreover, there are no automated solutions for detecting weld porosity in a highly accurate and reliable manner. In particular, current solutions are unable to meet the requisite level of accuracy and reliability sought by the manufacturing industry. As an example, some solutions detect weld porosity by monitoring the voltage and current readings from a welding robot and inferring whether porosity is occurring based on variations in these parameters. These solutions produce a large number of false positives and achieve poor overall accuracy, however, as voltage and current can fluctuate due to various conditions other than porosity.

Moreover, all current solutions are all in the space of supervised learning, which means they are trained using a large collection of welding data samples that must be manually labeled with a ground truth indication of quality (e.g., good weld vs. bad weld, porosity vs. no porosity). As noted above, this manual labeling process can be very tedious, time consuming, and costly.

Accordingly, this disclosure presents a solution for detecting anomalies in industrial processes based on audio and/or visual artifacts. As an example, the solution can be used to detect porosity during welding operations based on audio and/or video captured during the welds. The described solution is highly reliable and repeatable, and it is also scalable due to its robustness to the make/model of the subsystems that are part of or otherwise influence the process chain.

Moreover, the described solution supports both supervised and unsupervised embodiments. Thus, with respect to the unsupervised embodiments, the described solution does not require any pre-training of the AI engine nor any associated annotation efforts, and it is highly adaptive to the patterns of the machines, thus making it easily deployable and scalable.

Further, as described further throughout this disclosure, the described solution has been tested and proven for detecting anomalies in welding operations. The described solution, however, can be used to detect a wide variety of anomalies for many different types of industrial processes and materials, including (among other examples):

(i) welding processes (e.g., electric-, gas-, and laser-based welding techniques for metals, thermoplastics, and other materials, including gas metal arc welding (GMAW) and other forms of electric arc welding);

(ii) cutting processes (e.g., electric-, gas-, and laser-based cutting techniques for metals, thermoplastics, and other materials);

(iii) additive manufacturing (AM) or 3D printing processes (e.g., material extrusion AM techniques such as fused deposition modeling (FDM), laser-based AM techniques such as selective laser sintering (SLS) and selective laser melting (SLM)); and (iv) many other types of fabrication, metalworking, and/or construction processes.

The described solution provides numerous advantages. For example, the described solution is a turnkey solution for industrial entities that addresses their need to increase the level of automation for industrial processes using artificial intelligence and machine learning, particularly in the areas of quality control, anomaly detection, process monitoring, and so forth. In particular, this solution addresses many of the key requirements of industrial entities, one of which is an unsupervised AI method to detect or predict anomalies in industrial processes or products—in real time or near real time—to avoid monetary losses and efforts in the form of rework and scrap during quality inspections.

Moreover, the described solution can be easily scaled to detect other types of welding anomalies beyond porosity, and/or detect anomalies for other types of industrial processes beyond welding. For instance, high-resolution camera images may be captured during operation of an industrial tool by a robot to capture visible particle scatter resulting from the industrial processing performed using the robot. The high-resolution camera images may be captured by a camera sensor mounted on the robot itself and/or a camera sensor mounted external to the robot and observing performance of the industrial operation by the robot. The high-resolution images may be provided to processing circuitry (e.g., internal or integral to the robot or external to the robot) to perform machine-learning techniques on the images to detect or predict the occurrence of anomalies in the industrial process in near real time. The detection of such real or predicted anomalies may be then utilized by a hardware controller for the robot (e.g., integral to or otherwise mounted on the robot or controlling the robot externally (e.g., wirelessly)) to adjust or stop the robot's performance of the industrial process based on the detected anomaly.

In some implementations, monitoring and processing of a weld pool using a high-resolution camera requires a lot of processing power, as the results are expected in real time and actions need to be taken based on inferences. Thus, the described solution can be implemented using high-performance compute and/or dedicated compute (e.g., FPGA) resources deployed at the edge. Moreover, due to the repeatability factor of this solution, those same edge resources can be used to scale the solution for entities that employ welding techniques in their manufacturing process. For example, since the overall solution solves the problem of deploying a camera to monitor a weld pool in the harshest of environments in which the camera is still able to function, other weld-related problems and anomalies can be easily addressed by simply developing different AI models and deploying them on the same solution setup.

FIG. 1 illustrates an example of a manufacturing environment 100 that leverages real-time anomaly detection for industrial processes in accordance with certain embodiments.

In the illustrated manufacturing environment 100, products (e.g., vehicles) are manufactured on a production line 102. The production line 102 is organized into a series of modular cells 104a-d throughout the factory floor, and products that are being assembled move down the line 102 from cell to cell. Each cell 104a-d contains a collection of devices and equipment 105 for performing certain tasks required to assemble the product, such as autonomous robots equipped with certain tool(s).

As an example, an automotive factory that manufactures automobiles may have hundreds or thousands of autonomous robots distributed throughout the cells 104a-d of the production line 102. Each robot is typically equipped with a tool of some kind to perform at least a portion of an industrial process—such as a welding gun, glue gun, riveting machine, pump, drill, saw, grinder, laser, or screwdriver—which the robot uses to perform a specific task required to perform an industrial process, such as the assembly of an automobile (e.g., based on specific reference parameters that control how the task is to be performed). Such industrial processes may result in the scatter of physical or light particles, which may be visually captured by a camera sensor monitoring the robot. For example, multiple robots (e.g., hundreds or even thousands) may use a welding gun to perform spot welds to weld pieces of metal together, such as to assemble the chassis of a vehicle. For a large factory that produces hundreds or even thousands of vehicles per day—with thousands of welds required per vehicle—millions of welds can be performed in a single day of production.

Moreover, various compute resources 110a-e are deployed to control the tasks performed in each cell 104a-d. In some embodiments, for example, the compute resources 110a-e may include controllers for the robots, controllers for the tools used by the robots, and control computers or servers (e.g., an Industrial PC (IPC)) to control, coordinate, and/or monitor the various equipment (e.g., robots/tools and their associated controllers) and tasks performed in each cell 104a-d of the production line 102. In some cases, for example, a control computer in each cell 104a-d may provide a user interface that enables factory operators to control the equipment and tasks performed in that cell. Moreover, the control computers or servers may also be used to perform real-time anomaly detection or quality control for tasks performed in the cells 104a-d.

In some embodiments, for example, anomaly detection is performed based on data streams that are generated whenever a particular industrial process—such as welding—is performed on the production line 102. For example, a corresponding data stream may be generated each time the particular industrial process is performed. Moreover, the data stream may include values for a collection of parameters, or "features," relating to the performance of that industrial process. The underlying data values in the data stream can include any representation of data from any type or combination of modalities. For example, the data stream may include a collection of data and/or metadata associated with the performance of the industrial process, such as reference or configuration parameters (e.g., parameters used to configure a robot or tool to perform the industrial process), audio and/or video captured during the industrial process, voltage and current readings for equipment/tools used to perform the industrial process, and/or any other parameters or data captured or measured during the industrial process (e.g., by sensors, controllers, and/or other devices and equipment).

As an example, a corresponding data stream may be generated every time a welding operation is performed on the production line 102. In various embodiments, the data stream for a welding operation may include some or all of the following types of information (among other examples):

(i) the type, thickness, and resistance of the metal being welded;

(ii) the time/date in which the weld is performed;

(iii) the location in the factory where the weld is performed (e.g., the particular cell 104*a-d* on the production line);

(iv) the location of the weld on the product being produced (e.g., on a vehicle);

(v) an identifier of the particular robot, robot arm, and welding gun that performed the weld;

(vi) maintenance history for the welding gun/controller (e.g., the last time the controller and/or welding gun received maintenance and the type of that maintenance);

(vii) video or images captured during the weld (e.g., by a camera or other vision sensor);

(viii) audio captured during the weld (e.g., by an audio sensor or microphone);

(ix) the voltage curve, current curve, force, and torque for the welding gun and/or other equipment/tools used to perform the weld; and (x) the health of the electrodes on the welding gun.

Moreover, the data streams generated for these industrial processes can be ingested and analyzed—at the edge (e.g., by compute servers 110*a-e*) or in the cloud—to perform quality control or anomaly detection. In some embodiments, for example, anomaly detection may be performed using supervised or unsupervised methods of artificial intelligence (AI), machine learning (ML), and/or statistical analysis, such as deep learning (e.g., using convolutional neural networks (CNN)), statistical process control (SPC), and so forth.

In some embodiments, for example, data streams generated during welding operations may be used to detect faulty welds. As an example, audio and/or video streams captured during a weld may be analyzed to determine whether (and when) the weld becomes contaminated by porosity, as described further throughout this disclosure.

In this manner, real-time quality control or anomaly detection can be performed on the production line, such as detecting faulty production tasks (e.g., faulty welds), detecting faulty parts used or produced on the production line (e.g., parts produced with faulty welds), performing appropriate remedial measures to minimize the impact of detected faults (e.g., aborting, reworking, and/or scrapping parts with faulty welds), proactively performing certain preventive measures to prevent or minimize future faults during production (e.g., performing configuration changes and/or maintenance tasks), and so forth.

Accordingly, the described solution enables quality control to be performed automatically without relying on manual inspections—and with greater accuracy—for 100% of the production tasks and output as opposed to only a very small percentage or sample evaluated through manual inspections. Moreover, while quality control for industrial use cases is discussed as an example, the described solution can be leveraged for any use case involving anomaly detection or quality control.

The described solution is described in further detail throughout this disclosure in connection with the remaining figures.

Figure 2:
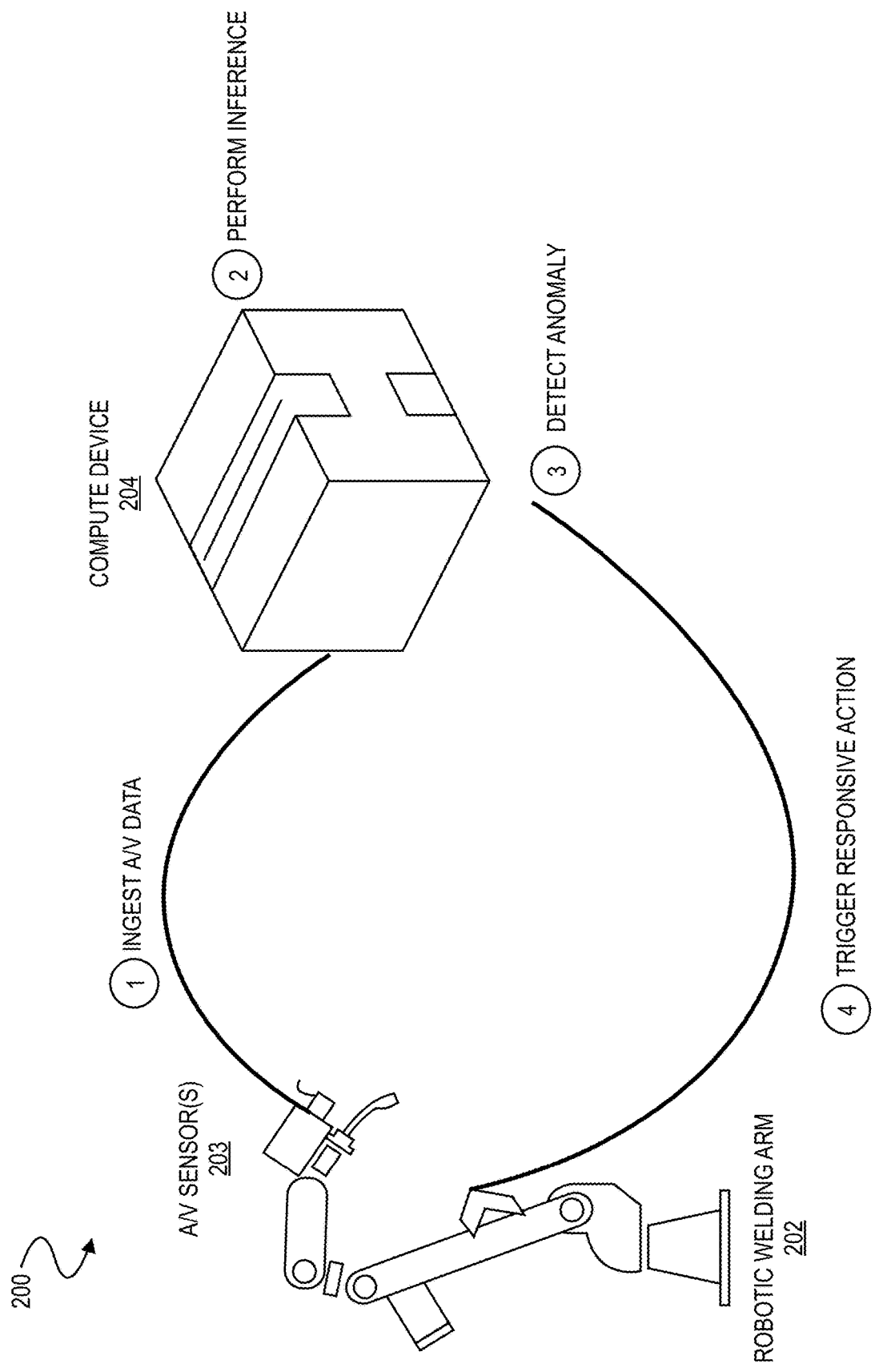
FIG. 2 illustrates an example embodiment of an anomaly detection system for welding operations.

FIG. 2 illustrates an example embodiment of an anomaly detection system 200 for welding operations. In the illustrated embodiment, anomaly detection system 200 includes a robotic welding arm 202 (e.g., a robotic arm equipped with a welding gun), audio/video (A/V) sensors 203 (e.g., a camera and/or microphone, such as a USB3 or GigE Vision camera), and a compute device 204.

In the illustrated embodiment, the described solution is used to detect porosity during welding operations using the open arc pattern and/or the pitch of sound produced during the weld as the primary anomaly detection metric(s). Weld porosity occurs when contamination of the weld traps gases within the weld, creating a weak and faulty weld and thus a product defect that requires rework or scrap.

There are many variables that can contribute to the occurrence of weld porosity, but the main visual output of its occurrence is a "flare" of sparks at the weld (e.g., an abnormally high concentration of sparks). This flare of sparks is visible and has the appearance of scatter in visual data captured during the weld (e.g., video frames or images captured by a camera or other vision sensor). As a result, porosity can be detected based on the level of scatter present in the visual data.

Similarly, porosity can also be detected based on auditory characteristics, such as the pitch of sound produced by the weld (e.g., based on audio captured by a microphone or other sound sensor).

In this manner, machine vision and/or audio techniques are employed to monitor welds and detect porosity in real time based on the scatter and/or pitch produced during the weld, which can eliminate or reduce the number of rejected products during final inspections.

In the illustrated embodiment, for example, a video camera 203 is attached to a welding robot 202 at a fixed position so that near real-time inspection of the weld at the tip can be analyzed by an edge compute device 204 (e.g., an industrial PC (IPC)) to detect porosity. Additionally, or alternatively, a microphone 203 can be used to capture sound produced by the weld, and the pitch of the sound can be analyzed by the compute device 204 to detect porosity. Upon detecting porosity, the compute device 204 signals the weld robot 202 (e.g., via a corresponding robot controller) to perform an appropriate corrective action, such as stopping the current weld to prevent the perpetuation of porosity throughout the weld.

Therefore, an algorithm needs to be generated or trained to create this inference capability at the edge. In some embodiments, for example, supervised learning techniques can be used to train a machine learning model to detect porosity based on a labeled training dataset (e.g., audio or video samples captured during past welds that have been manually labeled with an indication of whether porosity occurred). Alternatively, in some embodiments, an unsupervised method can be used to train or develop the AI system, thus providing a self-learning AI system that eliminates the need for human intervention to manually label a training dataset.

A welding environment is one of the harshest environments for using electronic devices (e.g., cameras, microphones, controllers, processing units), particularly with respect to temperature, sparks, fumes, and so forth. The following are examples of the conditions in a typical welding environment:

(i) factory temperature: 50-90° F.;

(ii) temperature of weld pool: over 2500° F.;

(iii) temperature of weld plate: 500° F. away from the weld zone to 1500° F. near the weld zone.

Thus, developing a vision- or audio-based solution to detect porosity can be challenging. For example, one option is to set up a camera about 10-15 feet away from the welding robot to monitor the welding process and report porosity if significant sparks are detected. This environment would be friendlier for the camera, but since welding is performed by a robot, the field of view for monitoring the weld can continuously change based on movement of the robot, which will affect the accuracy of AI model. Similarly, when replicating this solution in another setup, the unique conditions in that environment (e.g., overall lighting, distance from weld) can also affect the accuracy of the AI model. For example, a highly accurate model in one setup can fail completely in another setup.

Accordingly, in the illustrated embodiment, a camera 203 is mounted on the welding gun. In this manner, the distance from the weld pool to the camera 203 will remain constant across different deployments. Similarly, the light source for the camera is provided by the sparks from the welding process, and thus the lighting will also remain relatively consistent across deployments. Moreover, images or video frames captured by the camera are fed into a compute device 204, which processes the feed in near real time based on the AI inference model to detect defects such as porosity. In this manner, the process of detecting defective welds is completely automated, thus eliminating the need for a human operator to manually monitor the camera feed on a screen to assess whether defects occur.

Additional details regarding the development and implementation of the anomaly detection model are described below in connection with the remaining figures.

Supervised Anomaly Detection Using Audio and/or Video

Figure 3:
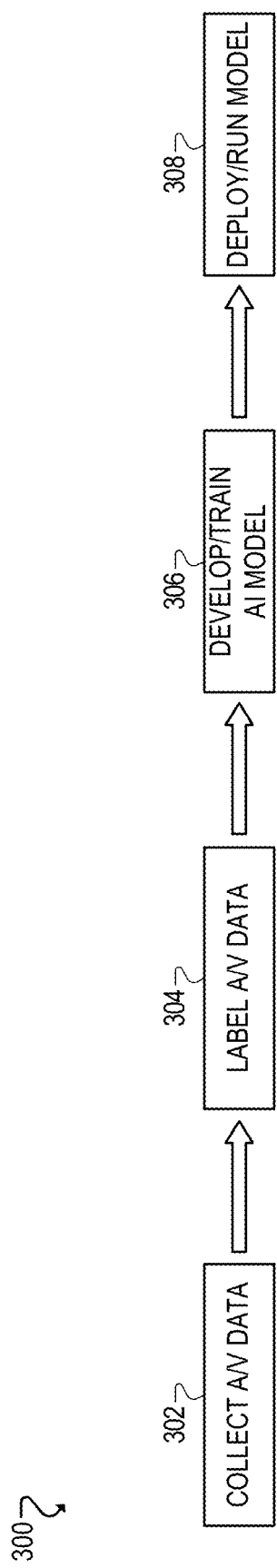
FIG. 3 illustrates an example of the development process for supervised anomaly detection using audio and/or video data.

FIG. 3 illustrates an example of the development process 300 for supervised anomaly detection using audio and/or video (A/V) data. In particular, the illustrated example shows the steps involved in developing and training an anomaly detection model for an industrial process (e.g., welding) using supervised learning techniques. In some embodiments, for example, the resulting anomaly detection model could be used by the anomaly detection system 200 of FIG. 2 to detect anomalies during industrial processes.

The most critical piece of an artificial intelligence (AI) model is the underlying data used to develop or train the model. The amount of good data (e.g., good weld) and bad data (e.g., bad weld) are both equally important for developing a high accuracy model. In the illustrated example, the anomaly detection model is trained using video and/or audio data captured during an industrial process such as welding.

At step 302, audio/video streams are captured and collected during numerous welding operations. At step 304, the audio/video streams are then labeled (e.g., manually by a human operator) with an indication of whether and when a fault/anomaly occurred (e.g., porosity) during the corresponding weld operation. In some embodiments, for example, each video/audio stream for a weld operation contaminated by porosity may be labeled with the start time at which the porosity occurs. This labeled dataset is referred to as the training data, which is used to train the anomaly detection model.

At step 306, the AI model development system uses the training data to identify the problem area and train the anomaly detection model using the appropriate supervised learning techniques. In some embodiments, for example, the model may be trained to detect porosity during weld operations based on visual or auditory data captured by a camera or microphone. Examples of machine learning and/or artificial intelligence techniques that may be used to train the model include support vector machines (SVM), clustering (e.g., k-nearest neighbors (kNN), Gaussian mixture models (gMM), k-means clustering), deep learning (e.g., convolutional neural networks (CNNs)), decision tree learning (e.g., random forest), and so forth.

Once the model has been developed/trained, at step 308 the model is deployed using a hardware and software stack designed to handle ingestion, processing, and storage of the video and/or audio data. For example, the model may be deployed on a compute device that uses the model to detect anomalies (e.g., porosity) in weld operations based on video/audio streams received for multiple welding robots. In some embodiments, for example, the compute device receives multiple video/audio streams for weld operations performed by different welding robots, performs inference on those streams using the anomaly detection model, and detects anomalies in certain weld operations based on the inference results.

In some embodiments, to avoid false positives, the inference results for a particular stream may be averaged over a rolling time window, and an anomaly may only be detected if the average for the rolling window exceeds some threshold. For example, with respect to a video stream captured during a weld operation, the likelihood of an anomaly may be averaged for a rolling number of frames in the video stream—such as the most recent 16-18 frames—and an anomaly may be detected if the average exceeds a threshold (e.g., 95% likelihood of an anomaly).

The compute device may then trigger an appropriate action upon detecting an anomaly, such as sending a command to the corresponding robot/tool controller to abort the weld operation.

Unsupervised Anomaly Detection Using Video

Figure 4A:
FIGS. 4A-B illustrate examples images of good and bad welds.
Figure 4B:
Figure 5:
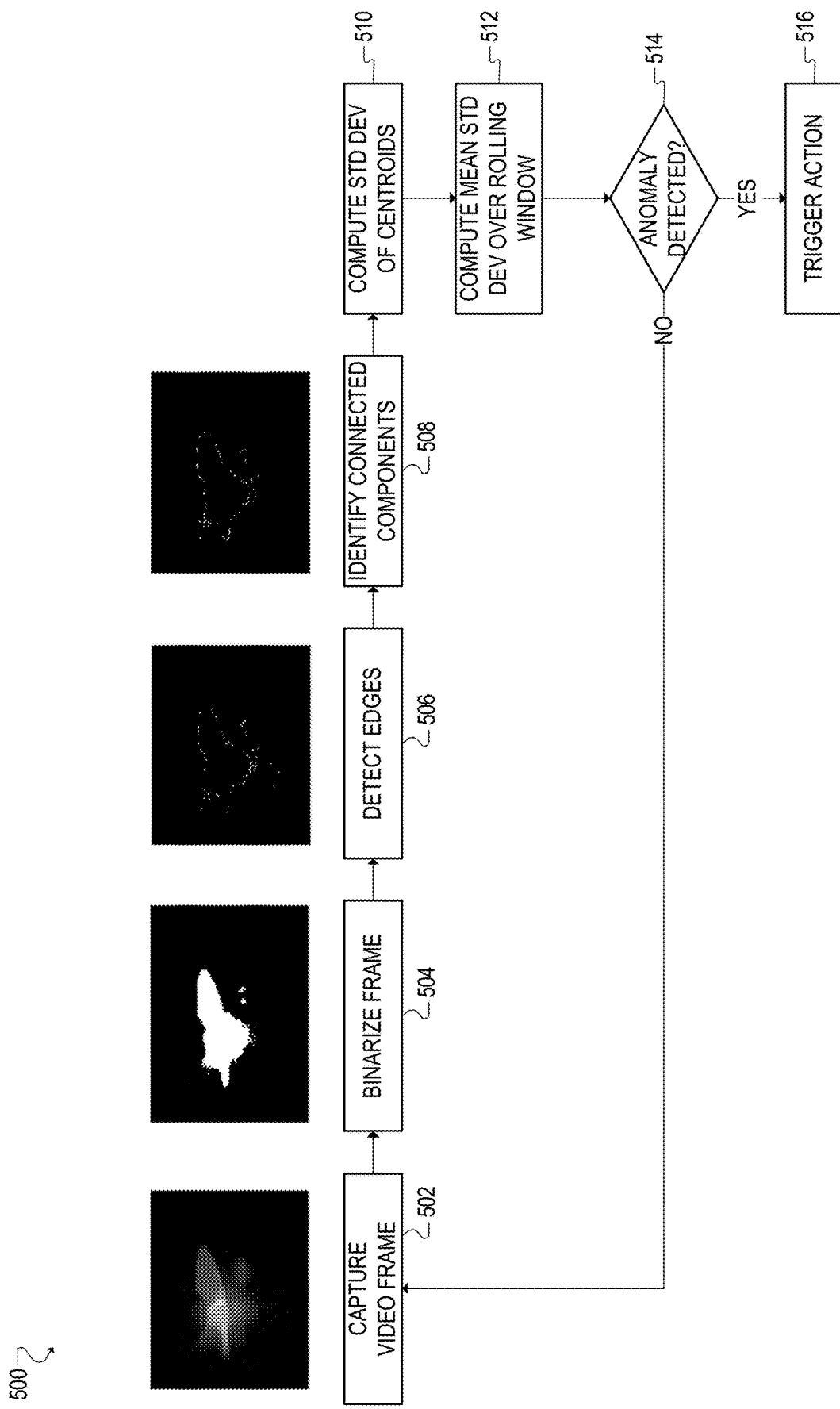
FIG. 5 illustrates an example process flow for unsupervised weld porosity detection based on a video stream captured during a weld.

FIGS. 4-6 illustrate an example of a framework for unsupervised anomaly detection using video analytics. In some embodiments, for example, the framework may be used to detect poor quality or faulty welds, such as welds contaminated by porosity, using an unsupervised approach.

To illustrate the framework, FIGS. 4A-B illustrate examples images of good and bad welds 401 and 402. In particular, FIG. 4A illustrates an image of a good weld 401 where porosity does not occur, while FIG. 4B illustrates an image of a bad weld 402 where porosity does occur.

As shown by these images, significantly more "scatter" is visible during the bad weld compared to the good weld, which is the result of visual artifacts that are caused by sparks during the weld. Thus, based on these images, the existence of scatter is observed to be a significant indicator of porosity occurring during a weld in real time.

Based on this observation, porosity can be detected by quantifying the level of scatter present in the visual data captured during a weld. In some embodiments, for example, scatter can be quantified by identifying the distinct connected components in each video frame or image of the weld, and then computing the standard deviation of the centroids of those connected components in the x and/or y axis of the image, where the x axis represents the direction of the weld and the y axis is perpendicular to the x axis.

In this manner, the mean standard deviation can be computed for frames over a rolling window (e.g., the 10 most recent frames), and porosity can be detected when the standard deviation of one or more frames exceeds the mean standard deviation over the rolling window by a particular threshold.

FIG. 5 illustrates an example process flow 500 for unsupervised detection of weld porosity based on a video stream captured during a weld. At step 502, a current video frame or image is captured during the weld operation. At step 504, the frame is binarized (e.g., converted into black and white). At step 506, edges in the binarized frame are detected (e.g., using standard image processing techniques). At step 508, distinct connected components formed by the edges detected in the frame are then identified.

At step 510, the standard deviation of the centroids of the identified connected components is computed in the x axis (direction of weld) and/or the y axis (perpendicular to direction of weld).

At step 512, the mean standard deviation is then computed for some number of frames over a rolling window (e.g., the 10 most recent frames, which may or may not include the current frame).

At step 514, anomaly detection is performed to determine whether porosity has occurred. In particular, the standard deviation for the current frame is compared to the mean standard deviation for the rolling window, and if the standard deviation for the current frame exceeds the mean standard deviation by a particular threshold (e.g., by a factor of 1.5-2 times the mean), then it may be determined that porosity has occurred. Alternatively, in some embodiments, to avoid false positives, multiple frames must exceed the mean standard deviation by the defined threshold before determining that porosity has occurred. The optimal threshold value to use for detecting porosity can be determined as described below in connection with FIGS. 6A-B.

If porosity is not detected, the process flow repeats back to step 502 to continue capturing and analyzing video frames during the weld operation. If porosity is detected, however, then at step 516, an appropriate action is triggered in response. In some embodiments, for example, a command may be sent to a robot controller to cause the robotic welding arm to abort the weld, repeat part of the weld, etc.

Figure 6A:
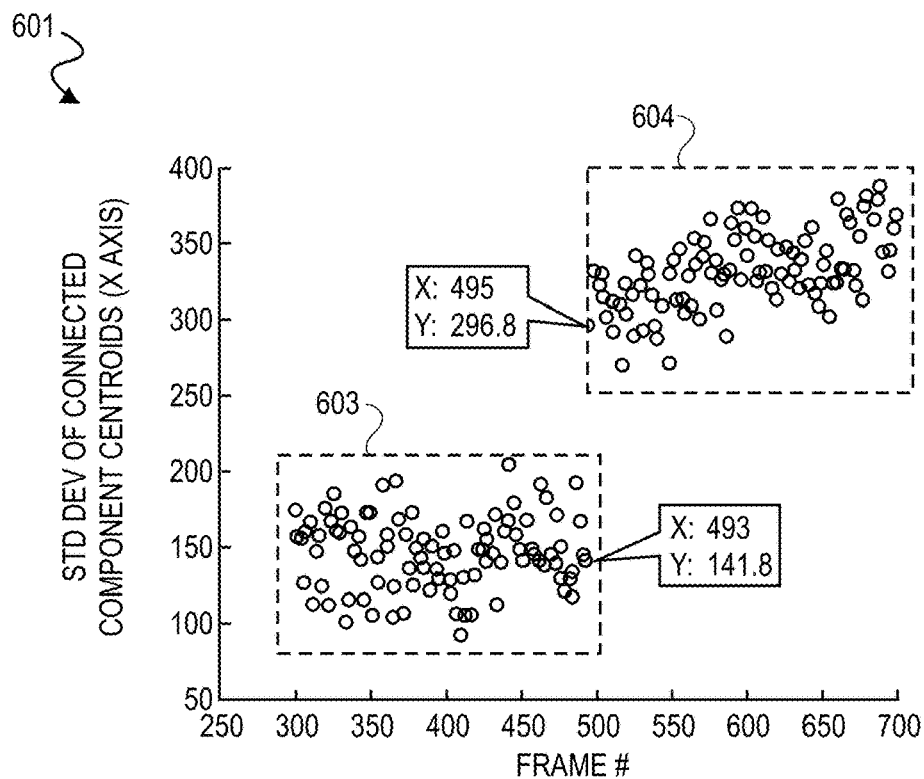
FIGS. 6A-B illustrate graphs of standard deviation metrics computed for video frames captured during a weld.
Figure 6B:
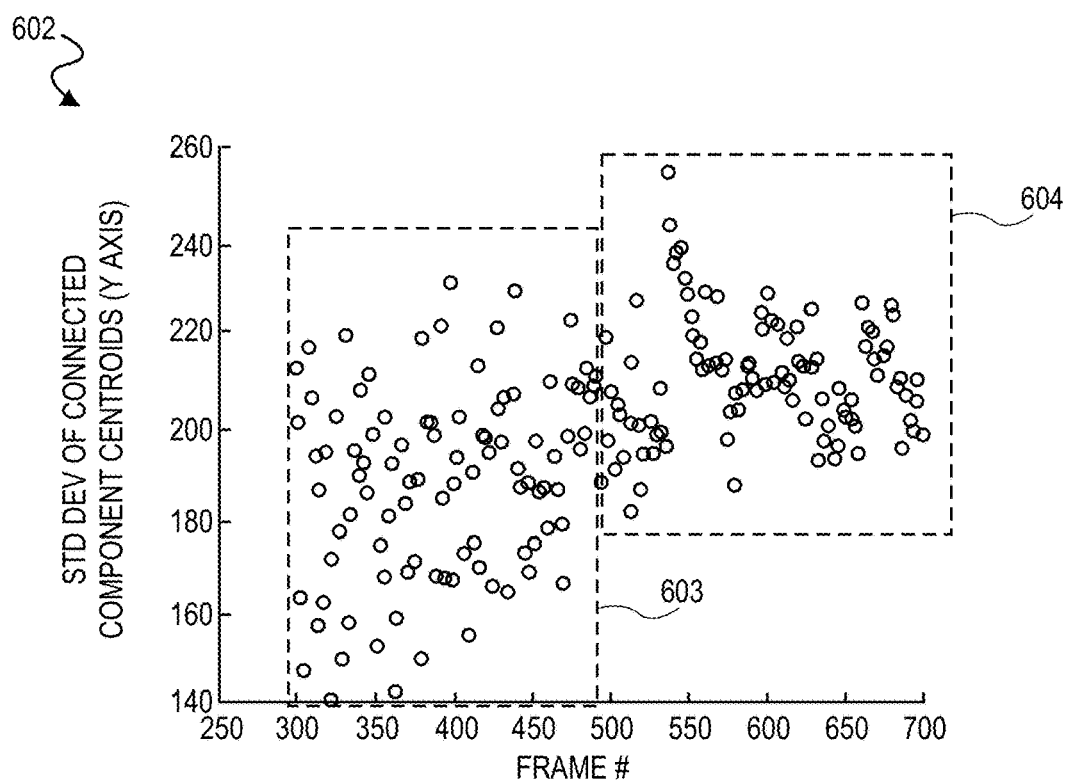

FIGS. 6A-B illustrate graphs showing the distribution of the standard deviation metrics video frames captured during a weld. In particular, FIG. 6A illustrates the standard deviation of the centroids of the connected components along the x axis of each image, which corresponds to the direction of the weld, while FIG. 6B illustrates the standard deviation of the centroids of the connected components along the y axis of each image, which is perpendicular to the direction of the weld.

In the illustrated example, porosity started occurring roughly halfway through the weld. Thus, the frames captured during the weld depict both good portions of the weld with no porosity 603 along with bad portions of the weld with porosity 604. For example, the values within box 603 represent the scatter metrics (e.g., standard deviations of centroids of connected components) computed for frames from the good portion of the weld (e.g., with no porosity), which continues through frame 493. The scatter associated with porosity begins at frame 495 and continues onwards. For example, the values within box 604 represent the scatter metrics (e.g., standard deviations of centroids of connected components) computed for frames from the bad portion of the weld (e.g., with porosity), which begins at frame 495 when porosity first occurs.

In FIG. 6A, the distribution of the computed scatter metric varies significantly before porosity versus after porosity. Thus, the scatter metric shown in FIG. 6A—which is the standard deviation of the centroids of the connected components along the x axis or the direction of the weld—serves as a good indicator of porosity.

Based on this observation, a statistical process control (SPC) method can be used to detect weld quality or porosity based on the computed scatter metric in FIG. 6A (e.g., the standard deviation of centroids of connected components in the direction of the weld), which represents the scatter captured in the frames in the direction of the weld.

In some embodiments, for example, the SPC method consists of a rolling or sliding window containing a few values of the scatter or standard deviation metric in FIG. 6A (e.g., 5-10 values). Moreover, for each position of the rolling window, the mean of the window is computed and then compared to the next value outside the window (e.g., for a window of size 10, the mean of the window is compared to the 11$^{th}$ value). If the next value (or series of values) outside the window exceeds the mean by a predetermined threshold—such as 1.5 to 2 times the mean—the value is considered to indicate an anomaly and an alert is raised.

In some embodiments, for example, the predetermined threshold can be determined based on experimentation. In FIG. 6A, for example, it can be observed that the value of the scatter standard deviation metric for the good frames is on the order of 150 and the value of that metric once porosity occurs is on the order of 350, which is an increase of more than double or 2×. Thus, the threshold for detecting porosity may be defined as two times the mean (2×), such that values that are over twice the size of the mean are flagged as indicators of porosity. In this manner, this parameter can be used to provide alerts for porosity conditions in welds in real time.

Anomaly Detection Using Audio

In some embodiments, the unsupervised anomaly detection process described above using video analytics (e.g., FIGS. 4-6) can similarly be implemented using audio. In particular, audio signals captured during the arc weld process can be processed in a similar manner to detect porosity.

Figure 7A:
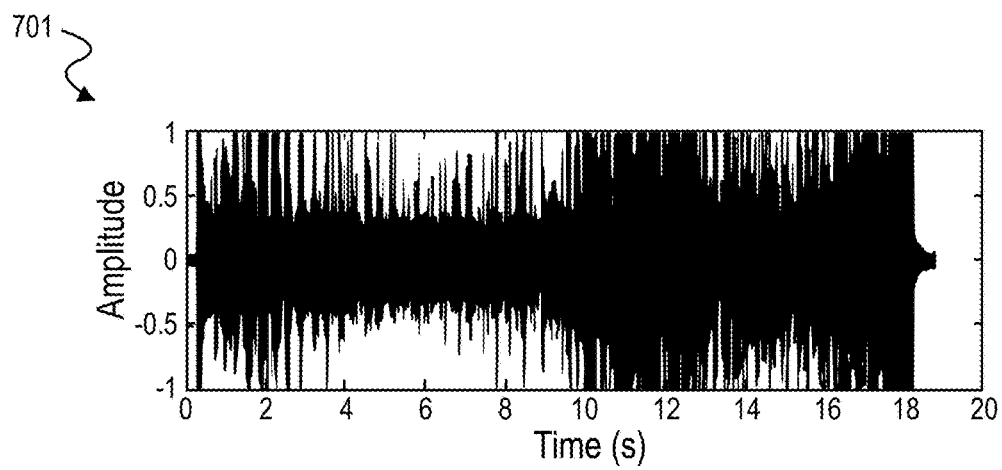
FIGS. 7A-C illustrate various properties of audio captured during a weld.
Figure 7B:
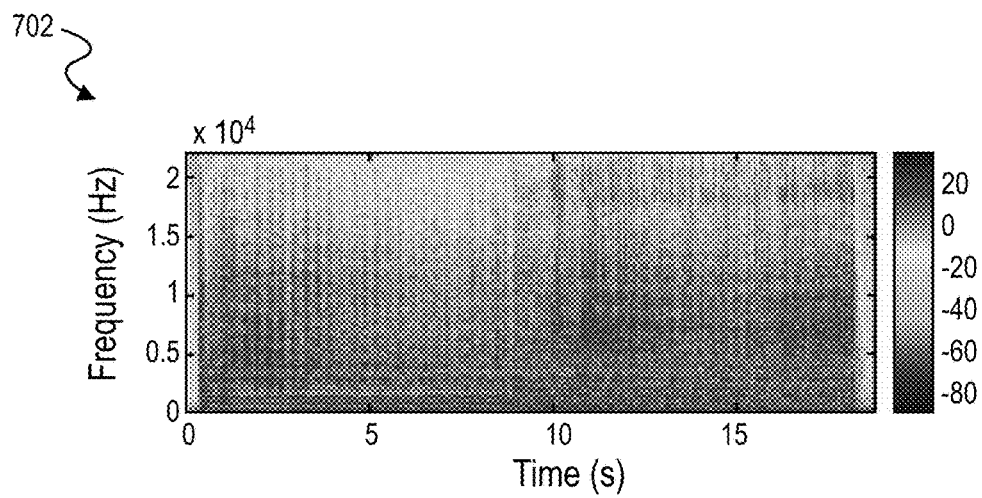
Figure 7C:
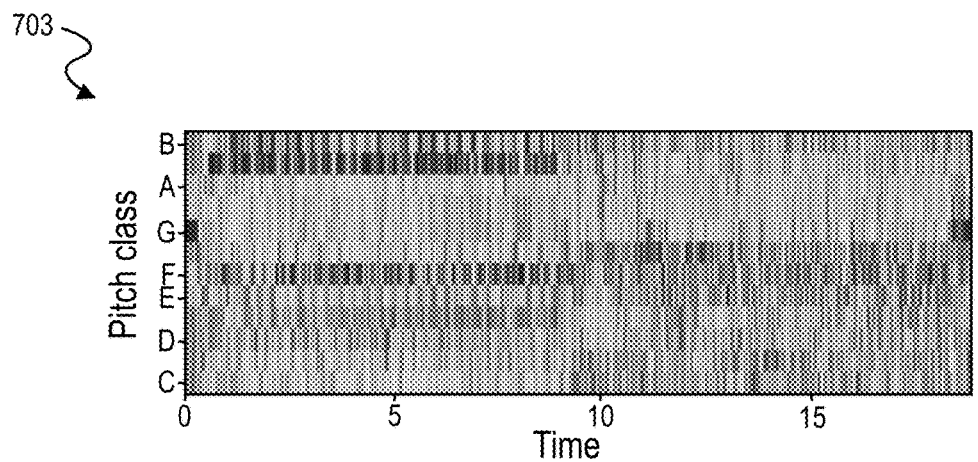

FIGS. 7A-C illustrate various properties of audio captured during a weld. In particular, FIG. 7A illustrates the amplitude of the audio, FIG. 7B illustrates a spectrogram of the audio, and FIG. 7C illustrates the pitch of the audio. In some cases, porosity can be detected based on characteristics of the sound produced during a weld, such as the amplitude of the sound (FIG. 7A) and/or a spectrogram of the sound (FIG. 7B). However, the pitch of the sound (FIG. 7C) is a novel parameter that is highly indicative of porosity anomalies, as the pitch of the welding sound clearly changes once porosity occurs.

For example, FIG. 7C illustrates the pitch pattern or chroma representation of the sound captured during the weld. The chroma representation indicates the intensity of each of the 12 distinct musical chroma of the octave at each time frame. This can be converted back into an audio signal simply by using the 12 chroma values to modulate 12 sinusoids, tuned to cover one octave.

As shown in FIG. 7C, the pitch pattern (chroma representation) changes as soon as porosity sets in around 9 seconds into the weld. Thus, the pitch of sound captured during the weld is a metric that clearly captures the instant in real time when porosity sets in and leads to a bad weld condition.

Accordingly, deviations in the pitch of sound captured during the weld can be used to detect porosity in a similar manner as described above for deviations in the amount of scatter that is visible in videos/images of the weld (e.g., as described above in connection with FIGS. 4-6). For example, any outlier detection algorithm (e.g., statistical process control (SPC)) can be used to detect porosity based on deviations in the pitch of audio captured during a weld.

Further, in some embodiments, supervised learning techniques can also be used to detect porosity based on changes in pitch. In some embodiments, for example, pitch values extracted from audio captured during welds may be converted into an image format (e.g., as shown in FIG. 7C), and these pitch images may be used to train a convolution neural network (CNN) to detect porosity. Alternatively, the numerical pitch values extracted from audio captured during welds may be used to train a model to detect porosity, such as using support vector machines (SVM), clustering (e.g., k-nearest neighbors (kNN), Gaussian mixture models (gMM), k-means clustering), decision tree learning (e.g., random forest), and so forth.

FIG. 8 illustrates an example process flow 800 for weld porosity detection based on audio captured during a weld. At step 802, audio is captured during a weld using a microphone or other sound sensor. At step 804, pitch values are extracted from the audio signal. At step 806, the pitch values are analyzed to determine whether porosity is detected (e.g., using the unsupervised or supervised anomaly detection techniques described above). If porosity is not detected, the process flow repeats back to step 802 to continue capturing and analyzing audio during the weld operation. If porosity is detected, however, then at step 808, an appropriate action is triggered in response. In some embodiments, for example, a command may be sent to a robot controller to cause the robotic welding arm to abort the weld, repeat part of the weld, etc.

Anomaly Detection Embodiments

Figure 9:
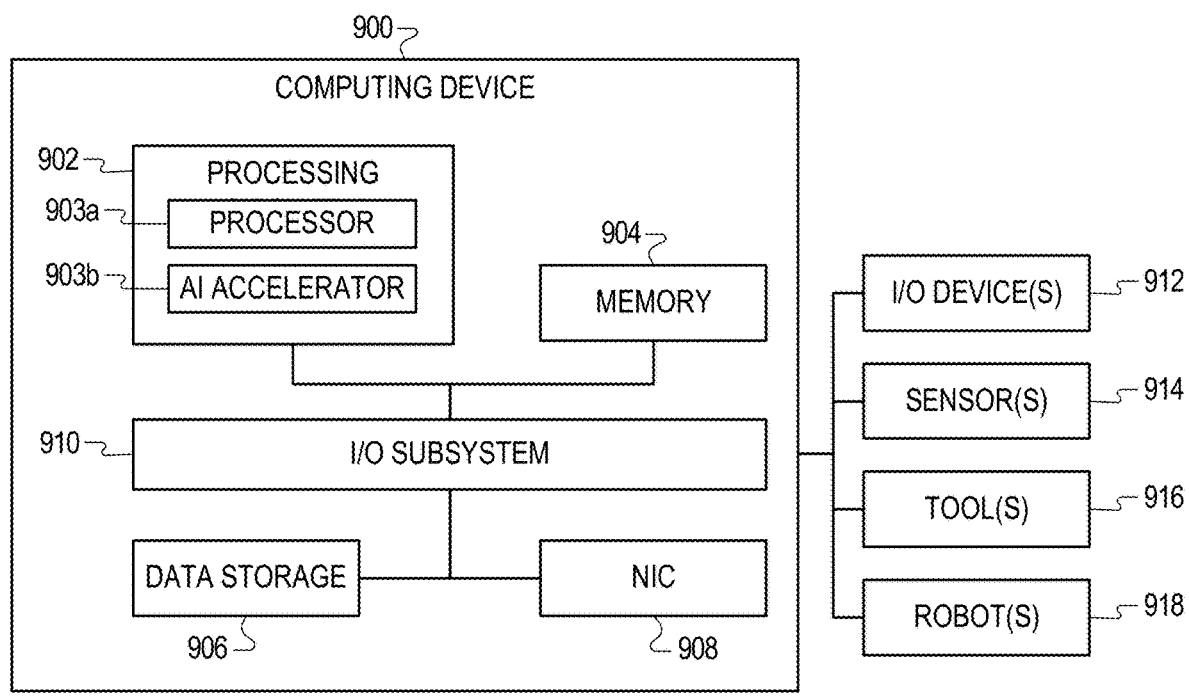
FIG. 9 illustrates an example of a computing device for real-time anomaly detection in accordance with certain embodiments.

FIG. 9 illustrates an example of a computing device 900 for real-time anomaly detection in accordance with certain embodiments. In some embodiments, for example, computing device 900 may be used to implement the anomaly detection functionality described throughout this disclosure.

In the illustrated embodiment, computing device 900 includes processing circuitry 902, memory 904, data storage device 906, network interface controller (NIC) 908, and input/output (I/O) subsystem 910. The processing circuitry 902 includes a collection of processing components 903, such as a processor 903a (e.g., central processing unit (CPU), microcontroller, etc.) and an artificial intelligence (AI) accelerator 903b (e.g., co-processor, ASIC, FPGA, etc.). The computing device 900 is also coupled to various other devices (e.g., via I/O subsystem 910 and/or NIC 908), such as I/O device(s) 912 (e.g., display/touchscreen, keyboard, mouse, etc.), sensor(s) 914 (e.g., cameras, audio/sound sensors (e.g., microphones), voltage/current sensors, temperature/thermal sensors, humidity sensors, pressure sensors, infrared (IR) sensors, accelerometers, etc.), tool(s) 916 (e.g., welding gun, glue gun, riveting machine, screwdriver, pump, grinder, laser welder, etc.), and/or robot(s) 918. In some embodiments, certain components of computing device 900 may be similar to those shown and described in connection with the computing devices of FIGS. 14A-B.

Further, computing device 900 may be used to implement any or all aspects of the anomaly detection functionality described throughout this disclosure. In some embodiments, for example, computing device 900 may receive video and/or audio streams captured during performance of industrial processes and perform anomaly detection based on the video and/or audio data within the streams.

In some embodiments, computing device 900 may be implemented as a standalone device that interfaces or communicates with the I/O devices 912, sensors 914, tools 916, and/or robots 918. Alternatively, or additionally, computing device 900 may be integrated with, or embedded as part of, one or more of the I/O devices 912, sensors 914, tools 916, and/or robots 918. Further, in some embodiments, the functionality of computing device 900 may be implemented or distributed across multiple devices (e.g., multiple servers, computing devices, controllers, tools, robots, etc.).

In some embodiments, for example, computing device 900 may be an industrial PC or edge server used to perform anomaly detection based on video and/or audio streams captured during industrial processes performed by the tools 916 and/or robots 918. Additionally, or alternatively, computing device 900 may be a tool or robot controller used to control one or more tools 916 and/or robots 918 and perform anomaly detection based on video and/or audio streams captured during the industrial processes performed by the tools 916 and/or robots 918. For example, computing device 900 may be a controller embedded within a particular tool 916 or robot 918, or computing device 900 may be an external controller used to control one or more tools 916 and/or robots 918. Additionally, or alternatively, computing device 900 may be a smart camera and/or smart microphone that includes camera/sound sensors to capture video and/or audio data during an industrial process and processing circuitry to perform anomaly detection based on the video and/or audio data.

Moreover, the tools 916 and/or robots 918 can include any type of tools, robots, machines, equipment, or other suitable devices depending on the particular use case. For example, the tools 916 may include welding guns, glue guns, riveting machines, screwdrivers, pumps, and/or other types of tools, machines, or equipment. Moreover, the robots 918 may include any devices, machines, and/or equipment for automating and/or aiding in the performance of certain tasks, including articulated robots, cartesian robots, cylindrical robots, polar/spherical robots, SCARA robots, delta robots, and humanoids, among other examples.

A robot, or robotic appliance, may be configured to automatically move within an environment and automatically perform one or more physical operations. A robot may be implemented in a variety of shapes and sizes, including robotic arms, humanoids, drones, and other implementations of robotic appliances. Computer processing hardware in the form of a system on chip (SoC), processor chips, integrated circuits, and other logic circuitry may be utilized to control operation of the robot and/or perform processing associated with control or management of the robot, including machine learning hardware to detect anomalies in the robot's interaction with its environment, such as described above. One or more sensor devices may be utilized in conjunction with the control or management of the robot by computer processing hardware. In some implementations, computer processing hardware controlling or processing information in association with the robot's operation may be resident on the robot. For instance, such processing hardware may be integrated on or within the robot. In other cases, processing hardware may be modular such that it may be removably attached and incorporated in the robot in a modular manner. Similarly, sensor devices may also be fixedly integrated or removably attached to the robot. In other instances, one or more of the computer processing hardware and/or sensors used in connection with the robot's operation may be provided external to the robot and may control, process information, or collect information remotely from the robot, among other example features and implementations. The features described herein may be incorporated or used in conjunction with a variety of robot appliance types, such as:

Articulated robots—which are also referred to as robotic arms or manipulator arms—are robots with rotary joints that resemble a human arm. For example, an articulated robot typically includes an arm with multiple links connected by rotary joints, which is attached to a base via a twisting joint. Each joint is an axis that provides an additional degree of freedom or range of motion, and each robot often includes four to six axes.

Cartesian coordinate robots—which are also referred to as rectilinear, gantry robots, and x-y-z robots—are designed for linear movement based on the Cartesian coordinate system (X, Y, and Z). For example, a cartesian robot typically includes three prismatic joints for linear movement along an X, Y, and Z axis, and may further include an attached wrist for rotational movement, such as three rotary joints to adjust its orientation in space.

Cylindrical coordinate robots include at least one rotary joint at the base and at least one prismatic joint to connect its links. The rotary joint provides rotational motion along the joint axis, while the prismatic joint provides linear motion. In this manner, cylindrical robots can move vertically and horizontally by sliding.

Polar robots—which are also referred to as spherical coordinate robots—typically include an arm connected to a base with a twisting joint, along with two rotary joints and one linear joint, forming a polar coordinate system.

SCARA robots (Selective Compliance Assembly Robot Arm) include two parallel joints for movement in the X-Y plane and are typically used for assembly applications that require precise lateral movements.

Delta robots—which are also referred to as parallel link robots—are spider-like robots with jointed parallelograms (e.g., parallel links) connected to a common base. Delta robots are often used for tasks that require precise movement and/or maneuvering.

Humanoids are robots that resemble a human, such as a robot that includes a body, arms, legs, and optionally a head.

Figure 10:
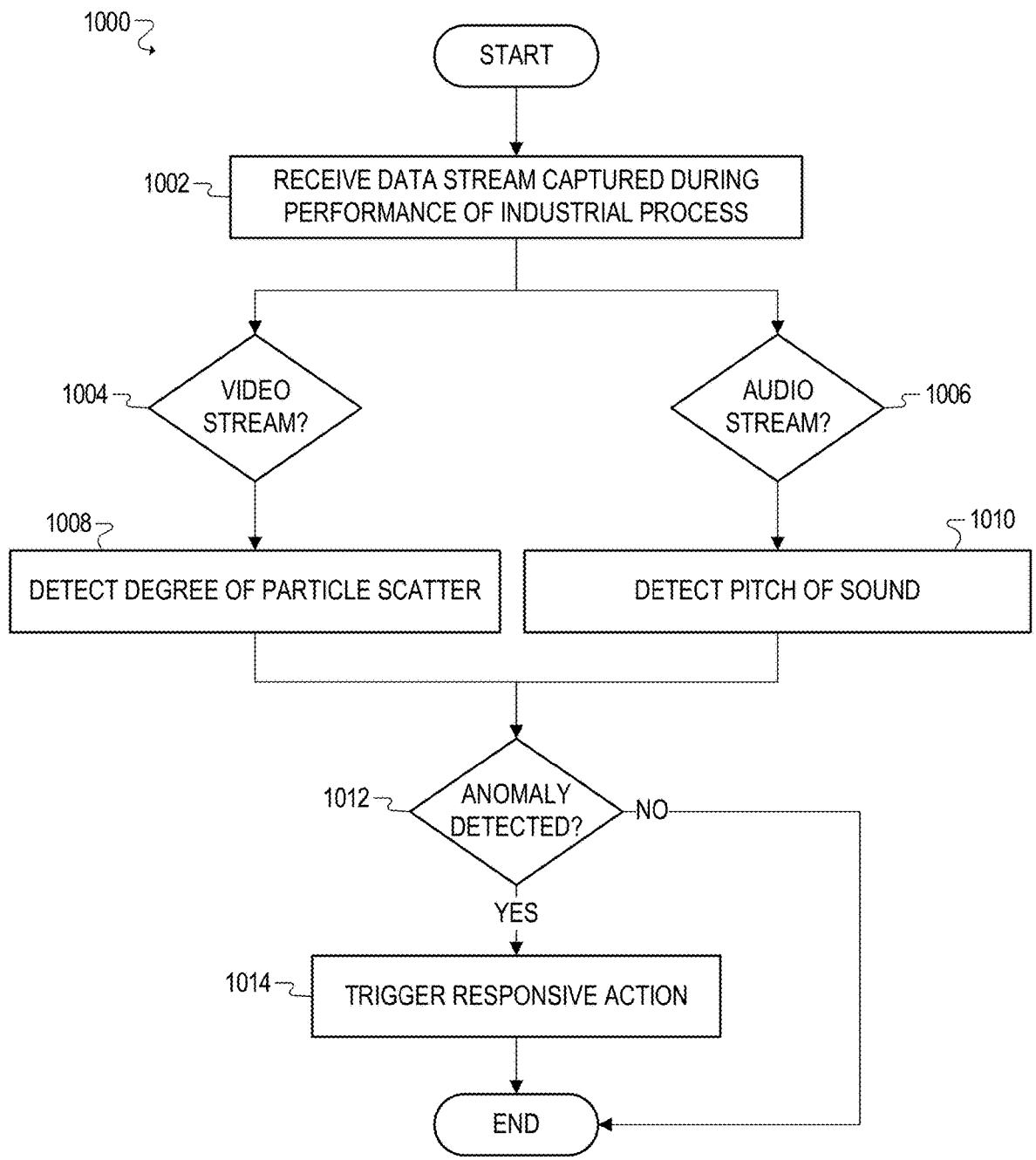
FIG. 10 illustrates a flowchart for performing real-time anomaly detection for industrial processes using audio and/or video.

FIG. 10 illustrates a flowchart 1000 for performing real-time anomaly detection for industrial processes using audio and/or video. In some embodiments, flowchart 1000 may be implemented and/or performed using the devices, systems, and functionality described throughout this disclosure (e.g., an edge computing device such as an industrial PC or robot/tool controller, and/or a cloud computing server).

In some embodiments, for example, flowchart 1000 may be used to detect a defect or anomaly in an industrial process performed by a robot, such as detecting porosity during a weld operation performed by a welding robot.

The flowchart begins at block 1002 by receiving a data stream (e.g., via interface circuitry) captured during performance of an industrial process, such as a weld operation or any other type of fabrication, manufacturing, and/or construction process. Moreover, the data stream may include a video stream captured by a camera and/or an audio stream captured by a microphone (e.g., video and/or audio captured during a weld operation). For example, the video stream may include a sequence of video frames captured during performance of an industrial process, while the audio stream may include an audio signal captured during performance of the industrial process.

Thus, the flowchart proceeds to blocks 1004 and 1006 to determine whether the data stream includes a video stream and/or an audio stream, respectively.

If the data stream includes a video stream, the flowchart proceeds to block 1008 to detect the degree, level, or extent of particle scatter that occurs during performance of the industrial process (e.g., by analyzing the sequence of video frames).

With respect to a weld operation, for example, the degree of particle scatter may refer to the degree of flame/spark scatter that occurs during performance of the weld operation. Moreover, to determine the degree of flame scatter that occurs during the weld operation, a scatter metric may be computed for the sequence of video frames, which indicates the average degree of flame scatter detected across the sequence of frames.

In some embodiments, for example, the degree of flame scatter in an individual frame is quantified by a standard deviation metric, which is computed as the standard deviation of the centroids of connected components detected within the particular frame. For example, in some embodiments, the standard deviation metric for a given frame is computed by binarizing the frame to generate a binarized frame, detecting edges in the binarized frame, detecting connected components corresponding to the edges, and computing the standard deviation of the centroids of the connected components.

In this manner, a standard deviation metric is computed for each frame in the sequence of frames, and a mean standard deviation metric is then computed by averaging the standard deviation metrics for the respective frames.

Additionally, or alternatively, if the data stream includes an audio stream, the flowchart proceeds to block 1010 to detect the pitch of sound captured during performance of the industrial process.

The flowchart then proceeds to block 1012 to determine whether an anomaly occurred during performance of the industrial process based on (i) the degree of particle scatter and/or (ii) the pitch of sound captured during the industrial process.

With respect to a weld operation, for example, porosity may be detected based on the scatter metrics computed for the frames in the video stream. For example, the mean standard deviation metric may be computed over a rolling window by averaging the standard deviation metric computed for each video frame captured during the rolling window. Moreover, if the standard deviation metric for one or more video frames following the rolling window exceed the mean standard deviation metric by a particular threshold (e.g., by a factor of 1.5-2 times the mean in some embodiments), then it may be determined that porosity has occurred.

Alternatively, or additionally, the pitch of the sound captured in the audio stream may be used to determine whether porosity occurred.

If it is determined that no anomaly occurred during performance of the industrial process, the flowchart may be complete. However, if an anomaly is detected, the flowchart then proceeds to block 1014 to trigger the appropriate remedial action(s), such as stopping, aborting, and/or restarting the industrial process, repeating a portion of the industrial process, flagging certain parts to be evaluated for rework or scrap, and so forth. In some embodiments, for example, a command may be sent to a robot/tool controller to cause the robot/tool to perform the desired action in response to the anomaly.

At this point, the flowchart may be complete. In some embodiments, however, the flowchart may restart and/or certain blocks may be repeated. For example, in some embodiments, the flowchart may restart at block 1002 to continue receiving and processing data streams to detect anomalies in industrial processes.

Example Computing Environments

The following sections present examples of computing devices, platforms, systems, architectures, and environments that may be used to implement the anomaly detection solution described throughout this disclosure.

Edge Computing Environments

Figure 11:
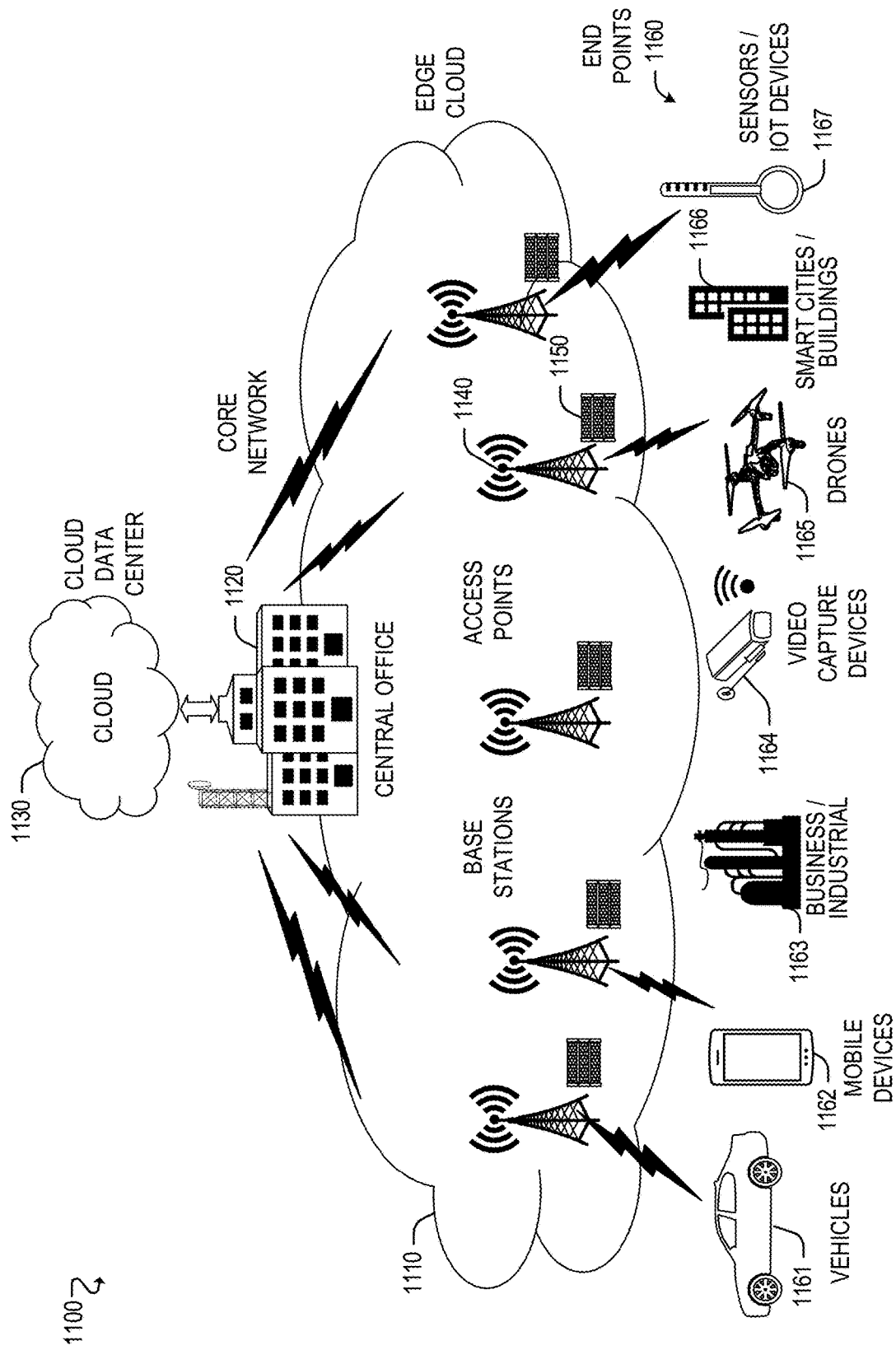
FIG. 11 illustrates an overview of an edge cloud configuration for edge computing.

FIG. 11 is a block diagram 1100 showing an overview of a configuration for edge computing, which includes a layer of processing referred to in many of the following examples as an "edge cloud". As shown, the edge cloud 1110 is co-located at an edge location, such as an access point or base station 1140, a local processing hub 1150, or a central office 1120, and thus may include multiple entities, devices, and equipment instances. The edge cloud 1110 is located much closer to the endpoint (consumer and producer) data sources 1160 (e.g., autonomous vehicles 1161, user equipment 1162, business and industrial equipment 1163, video capture devices 1164, drones 1165, smart cities and building devices 1166, sensors and IoT devices 1167, etc.) than the cloud data center 1130. Compute, memory, and storage resources which are offered at the edges in the edge cloud 1110 are critical to providing ultra-low latency response times for services and functions used by the endpoint data sources 1160 as well as reduce network backhaul traffic from the edge cloud 1110 toward cloud data center 1130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 12:
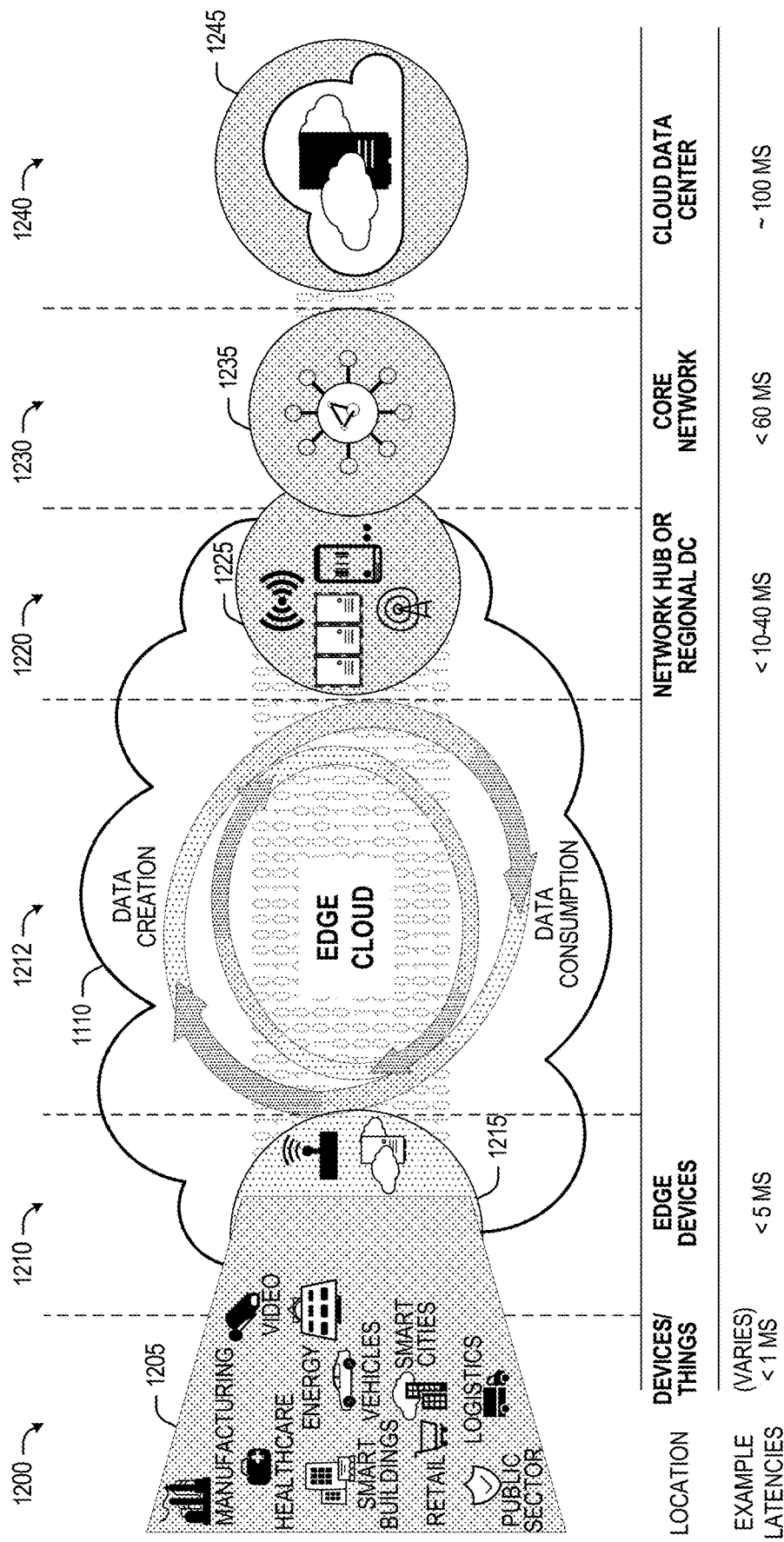
FIG. 12 illustrates operational layers among endpoints, an edge cloud, and cloud computing environments.

FIG. 12 illustrates operational layers among endpoints, an edge cloud, and cloud computing environments. Specifically, FIG. 12 depicts examples of computational use cases 1205, utilizing the edge cloud 1110 among multiple illustrative layers of network computing. The layers begin at an endpoint (devices and things) layer 1200, which accesses the edge cloud 1110 to conduct data creation, analysis, and data consumption activities. The edge cloud 1110 may span multiple network layers, such as an edge devices layer 1210 having gateways, on-premise servers, or network equipment (nodes 1215) located in physically proximate edge systems; a network access layer 1220, encompassing base stations, radio processing units, network hubs, regional data centers (DC), or local network equipment (equipment 1225); and any equipment, devices, or nodes located therebetween (in layer 1212, not illustrated in detail). The network communications within the edge cloud 1110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1200, under 5 ms at the edge devices layer 1210, to even between 10 to 40 ms when communicating with nodes at the network access layer 1220. Beyond the edge cloud 1110 are core network 1230 and cloud data center 1240 layers, each with increasing latency (e.g., between 50-60 ms at the core network layer 1230, to 100 or more ms at the cloud data center layer). As a result, operations at a core network data center 1235 or a cloud data center 1245, with latencies of at least 50 to 100 ms or more, will not be able to accomplish many time-critical functions of the use cases 1205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1235 or a cloud data center 1245, a central office or content data network may be considered as being located within a "near edge" layer ("near" to the cloud, having high latency values when communicating with the devices and endpoints of the use cases 1205), whereas an access point, base station, on-premise server, or network gateway may be considered as located within a "far edge" layer ("far" from the cloud, having low latency values when communicating with the devices and endpoints of the use cases 1205). It will be understood that other categorizations of a particular network layer as constituting a "close", "local", "near", "middle", or "far" edge may be based on latency, distance, number of network hops, or other measurable characteristics, as measured from a source in any of the network layers 1200-1240.

The various use cases 1205 may access resources under usage pressure from incoming streams, due to multiple services utilizing the edge cloud. To achieve results with low latency, the services executed within the edge cloud 1110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1110 may provide the ability to serve and respond to multiple applications of the use cases 1205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1110 (network layers 1200-1240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1110.

As such, the edge cloud 1110 is formed from network components and functional features operated by and within edge gateway nodes, edge aggregation nodes, or other edge compute nodes among network layers 1210-1230. The edge cloud 1110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1110 may be servers, multi-tenant servers, appliance computing devices, and/or any other type of computing devices. For example, the edge cloud 1110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 14B. The edge cloud 1110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 13:
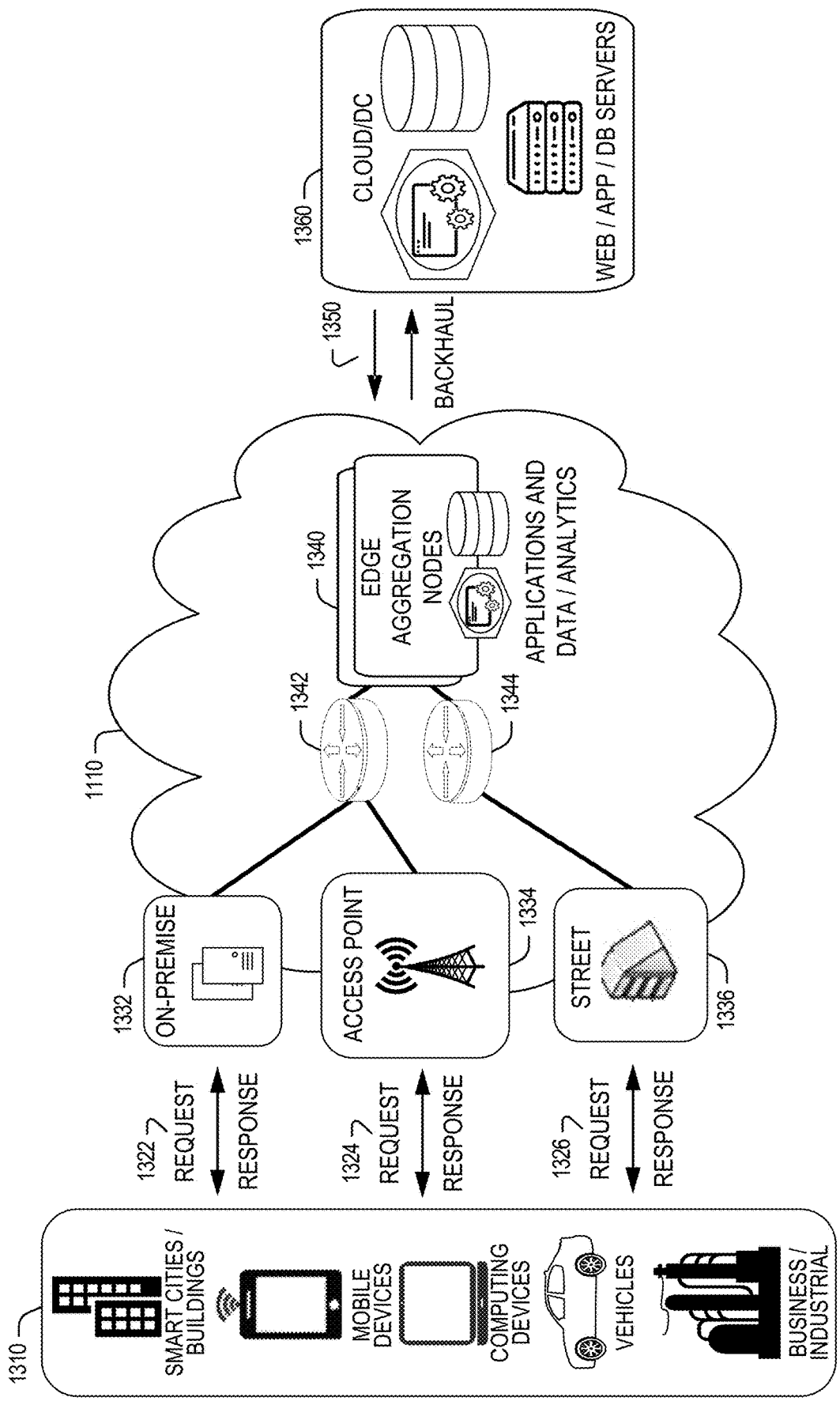
FIG. 13 illustrates an example approach for networking and services in an edge computing system.

In FIG. 13, various client endpoints 1310 (in the form of mobile devices, computers, autonomous vehicles, business computing equipment, industrial processing equipment) exchange requests and responses that are specific to the type of endpoint network aggregation. For instance, client endpoints 1310 may obtain network access via a wired broadband network, by exchanging requests and responses 1322 through an on-premise network system 1332. Some client endpoints 1310, such as mobile computing devices, may obtain network access via a wireless broadband network, by exchanging requests and responses 1324 through an access point (e.g., cellular network tower) 1334. Some client endpoints 1310, such as autonomous vehicles may obtain network access for requests and responses 1326 via a wireless vehicular network through a street-located network system 1336. However, regardless of the type of network access, the TSP may deploy aggregation points 1342, 1344 within the edge cloud 1110 to aggregate traffic and requests. Thus, within the edge cloud 1110, the TSP may deploy various compute and storage resources, such as at edge aggregation nodes 1340, to provide requested content. The edge aggregation nodes 1340 and other systems of the edge cloud 1110 are connected to a cloud or data center 1360, which uses a backhaul network 1350 to fulfill higher-latency requests from a cloud/data center for websites, applications, database servers, etc. Additional or consolidated instances of the edge aggregation nodes 1340 and the aggregation points 1342, 1344, including those deployed on a single server framework, may also be present within the edge cloud 1110 or other areas of the TSP infrastructure.

Computing Devices, Platforms, and Systems

Figure 14A:
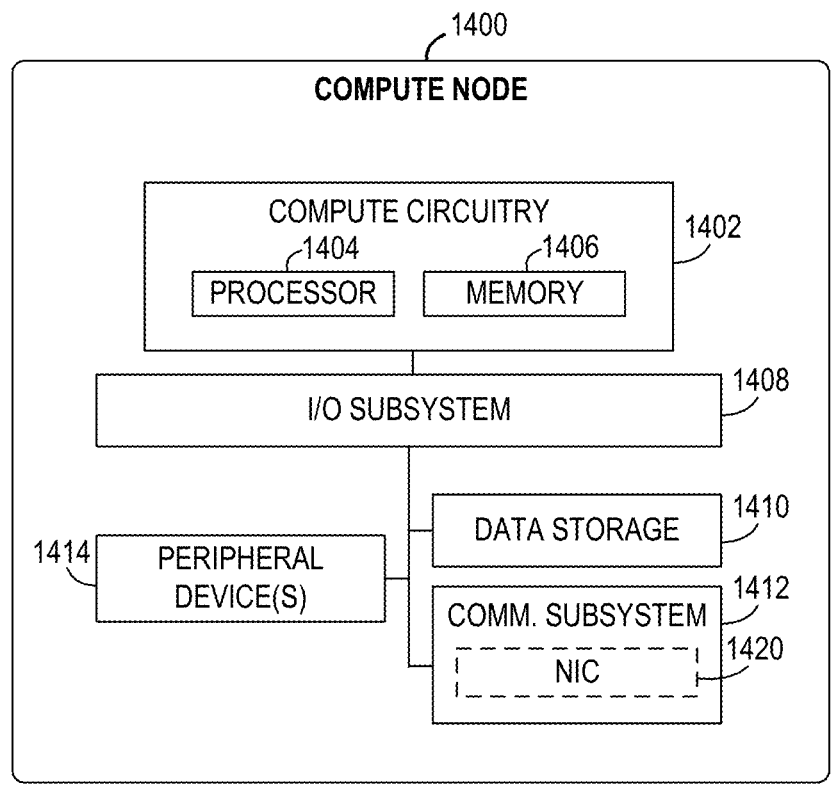
FIG. 14A provides an overview of example components for compute deployed at a compute node in an edge computing system.
Figure 14B:
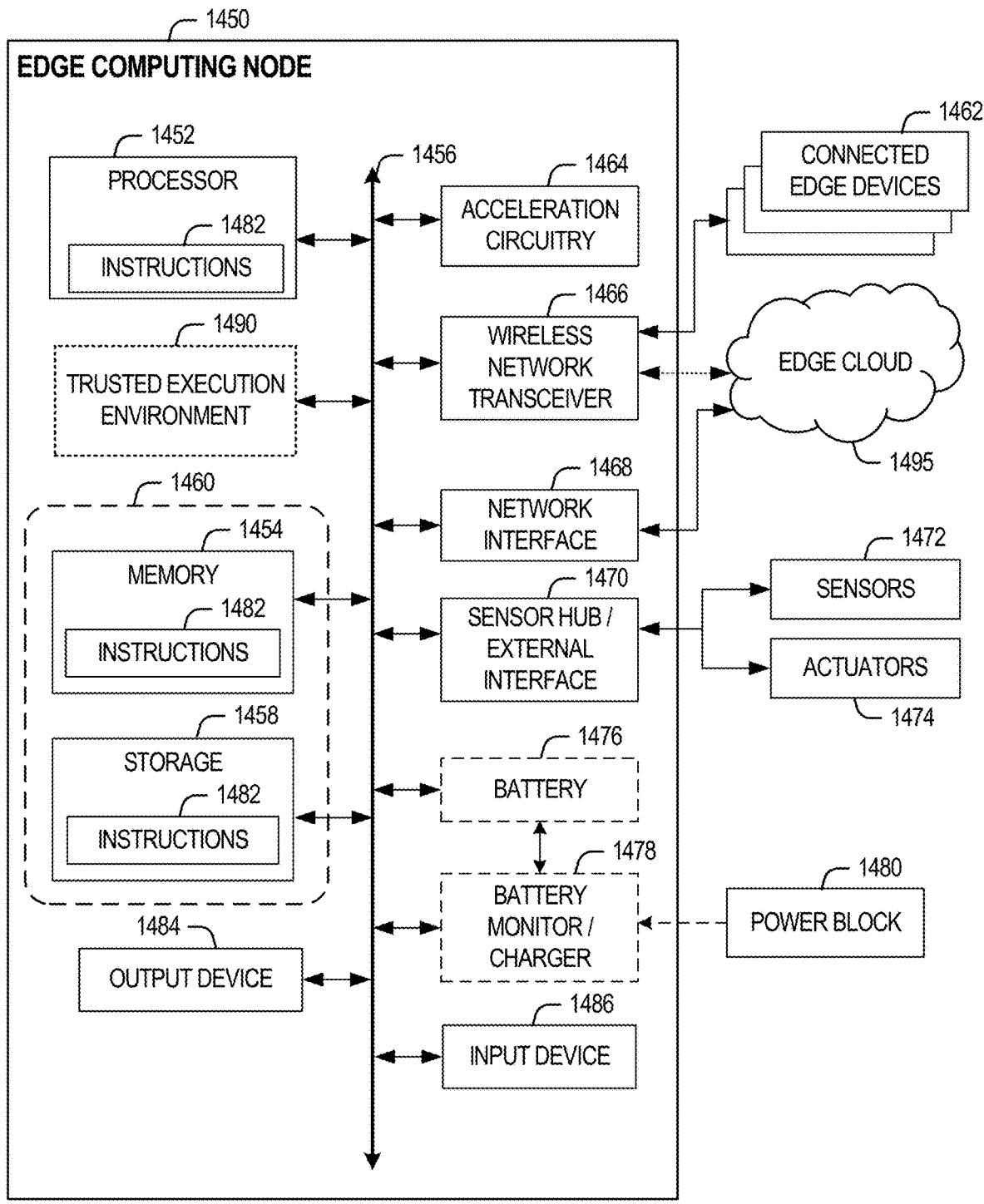
FIG. 14B provides a further overview of example components within a computing device in an edge computing system.

FIGS. 14A-B illustrate example embodiments of compute devices. In various embodiments, any of the compute nodes or devices discussed throughout this disclosure may be fulfilled based on the components depicted in FIGS. 14A-B. For example, respective edge compute nodes may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), an edge or on-premise server, equipment, tool, robot, or other device or system capable of performing the described functions.

In the simplified example depicted in FIG. 14A, an edge compute node 1400 includes a compute engine (also referred to herein as "compute circuitry") 1402, an input/output (I/O) subsystem 1408, data storage 1410, a communication circuitry subsystem 1412, and, optionally, one or more peripheral devices 1414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1400 may be embodied as any type of engine, device, or collection of devices capable of performing various compute functions. In some examples, the compute node 1400 may be embodied as a single device such as an integrated circuit, an embedded system, a field-programmable gate array (FPGA), a system-on-a-chip (SOC), or other integrated system or device. In the illustrative example, the compute node 1400 includes or is embodied as a processor 1404 and a memory 1406. The processor 1404 may be embodied as any type of processor capable of performing the functions described herein (e.g., executing an application). For example, the processor 1404 may be embodied as a multi-core processor(s), a microcontroller, a processing unit, a specialized or special purpose processing unit, or other processor or processing/controlling circuit.

In some examples, the processor 1404 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1404 may work in coordination with each other to execute many types of operations and instructions within and on behalf of the compute node 1400.

The memory 1406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1406 may be integrated into the processor 1404. The memory 1406 may store various software and data used during operation such as one or more applications, data operated on by the application(s), libraries, and drivers.

The compute circuitry 1402 is communicatively coupled to other components of the compute node 1400 via the I/O subsystem 1408, which may be embodied as circuitry and/or components to facilitate input/output operations with the compute circuitry 1402 (e.g., with the processor 1404 and/or the main memory 1406) and other components of the compute circuitry 1402. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1408 may form a portion of a system-on-a-chip (SoC) and be incorporated, along with one or more of the processor 1404, the memory 1406, and other components of the compute circuitry 1402, into the compute circuitry 1402.

The one or more illustrative data storage devices 1410 may be embodied as any type of devices configured for short-term or long-term storage of data such as, for example, memory devices and circuits, memory cards, hard disk drives, solid-state drives, or other data storage devices. Individual data storage devices 1410 may include a system partition that stores data and firmware code for the data storage device 1410. Individual data storage devices 1410 may also include one or more operating system partitions that store data files and executables for operating systems depending on, for example, the type of compute node 1400.

The communication circuitry 1412 may be embodied as any communication circuit, device, or collection thereof, capable of enabling communications over a network between the compute circuitry 1402 and another compute device (e.g., an edge gateway of an implementing edge computing system). The communication circuitry 1412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1412 includes a network interface controller (NIC) 1420, which may also be referred to as a host fabric interface (HFI). The NIC 1420 may be embodied as one or more add-in-boards, daughter cards, network interface cards, controller chips, chipsets, or other devices that may be used by the compute node 1400 to connect with another compute device (e.g., an edge gateway node). In some examples, the NIC 1420 may be embodied as part of a system-on-a-chip (SoC) that includes one or more processors, or included on a multichip package that also contains one or more processors. In some examples, the NIC 1420 may include a local processor (not shown) and/or a local memory (not shown) that are both local to the NIC 1420. In such examples, the local processor of the NIC 1420 may be capable of performing one or more of the functions of the compute circuitry 1402 described herein. Additionally, or alternatively, in such examples, the local memory of the NIC 1420 may be integrated into one or more components of the client compute node at the board level, socket level, chip level, and/or other levels.

Additionally, in some examples, a respective compute node 1400 may include one or more peripheral devices 1414. Such peripheral devices 1414 may include any type of peripheral device found in a compute device or server such as audio input devices, a display, other input/output devices, interface devices, and/or other peripheral devices, depending on the particular type of the compute node 1400. In further examples, the compute node 1400 may be embodied by a respective edge compute node (whether a client, gateway, or aggregation node) in an edge computing system or like forms of appliances, computers, subsystems, circuitry, or other components.

In a more detailed example, FIG. 14B illustrates a block diagram of an example of components that may be present in an edge computing node 1450 for implementing the techniques (e.g., operations, processes, methods, and methodologies) described herein. This edge computing node 1450 provides a closer view of the respective components of node 1400 when implemented as or as part of a computing device (e.g., as a mobile device, a base station, server, gateway, etc.). The edge computing node 1450 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1450, or as components otherwise incorporated within a chassis of a larger system.

The edge computing device 1450 may include processing circuitry in the form of a processor 1452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1452 may be a part of a system on a chip (SoC) in which the processor 1452 and other components are formed into a single integrated circuit, or a single package, such as the Edison™ or Galileo™ SoC boards from Intel Corporation, Santa Clara, California As an example, the processor 1452 may include an Intel® Architecture Core™ based CPU processor, such as a Quark™, an Atom™, an i3, an i5, an i7, an i9, or an MCU-class processor, or another such processor available from Intel®. However, any number of other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1452 and accompanying circuitry may be provided in a single socket form factor, multiple socket form factor, or a variety of other formats, including in limited hardware configurations or configurations that include fewer than all elements shown in FIG. 14B.

The processor 1452 may communicate with a system memory 1454 over an interconnect 1456 (e.g., a bus). Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example, the storage 1458 may be implemented via a solid-state disk drive (SSDD). Other devices that may be used for the storage 1458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1456 may couple the processor 1452 to a transceiver 1466, for communications with the connected edge devices 1462. The transceiver 1466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1466 (or multiple transceivers) may communicate using multiple standards or radios for communications at a different range. For example, the edge computing node 1450 may communicate with close devices, e.g., within about 10 meters, using a local transceiver based on Bluetooth Low Energy (BLE), or another low power radio, to save power. More distant connected edge devices 1462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1466 (e.g., a radio transceiver) may be included to communicate with devices or services in a cloud (e.g., an edge cloud 1495) via local or wide area network protocols. The wireless network transceiver 1466 may be a low-power wide-area (LPWA) transceiver that follows the IEEE 802.15.4, or IEEE 802.15.4g standards, among others. The edge computing node 1450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1466, as described herein. For example, the transceiver 1466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1468 may be included to provide a wired communication to nodes of the edge cloud 1495 or to other devices, such as the connected edge devices 1462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1468 may be included to enable connecting to a second network, for example, a first NIC 1468 providing communications to the cloud over Ethernet, and a second NIC 1468 providing communications to other devices over another type of network.

Given the variety of types of applicable communications from the device to another component or network, applicable communications circuitry used by the device may include or be embodied by any one or more of components 1464, 1466, 1468, or 1470. Accordingly, in various examples, applicable means for communicating (e.g., receiving, transmitting, etc.) may be embodied by such communications circuitry.

The edge computing node 1450 may include or be coupled to acceleration circuitry 1464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1456 may couple the processor 1452 to a sensor hub or external interface 1470 that is used to connect additional devices or subsystems. The devices may include sensors 1472, such as accelerometers, level sensors, flow sensors, optical light sensors, camera sensors, temperature sensors, global navigation system (e.g., GPS) sensors, pressure sensors, barometric pressure sensors, and the like. The hub or interface 1470 further may be used to connect the edge computing node 1450 to actuators 1474, such as power switches, valve actuators, an audible sound generator, a visual warning device, and the like.

In some optional examples, various input/output (I/O) devices may be present within or connected to, the edge computing node 1450. For example, a display or other output device 1484 may be included to show information, such as sensor readings or actuator position. An input device 1486, such as a touch screen or keypad may be included to accept input. An output device 1484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1450. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1476 may power the edge computing node 1450, although, in examples in which the edge computing node 1450 is mounted in a fixed location, it may have a power supply coupled to an electrical grid, or the battery may be used as a backup or for temporary capabilities. The battery 1476 may be a lithium ion battery, or a metal-air battery, such as a zinc-air battery, an aluminum-air battery, a lithium-air battery, and the like.

A battery monitor/charger 1478 may be included in the edge computing node 1450 to track the state of charge (SoCh) of the battery 1476, if included. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1478 may communicate the information on the battery 1476 to the processor 1452 over the interconnect 1456. The battery monitor/charger 1478 may also include an analog-to-digital (ADC) converter that enables the processor 1452 to directly monitor the voltage of the battery 1476 or the current flow from the battery 1476. The battery parameters may be used to determine actions that the edge computing node 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the edge computing node 1450. A wireless battery charging circuit, such as an LTC4020 chip from Linear Technologies of Milpitas, California, among others, may be included in the battery monitor/charger 1478. The specific charging circuits may be selected based on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine-readable medium 1460 including code to direct the processor 1452 to perform electronic operations in the edge computing node 1450. The processor 1452 may access the non-transitory, machine-readable medium 1460 over the interconnect 1456. For instance, the non-transitory, machine-readable medium 1460 may be embodied by devices described for the storage 1458 or may include specific storage units such as optical disks, flash drives, or any number of other hardware devices. The non-transitory, machine-readable medium 1460 may include instructions to direct the processor 1452 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1482 on the processor 1452 (separately, or in combination with the instructions 1482 of the machine readable medium 1460) may configure execution or operation of a trusted execution environment (TEE) 1490. In an example, the TEE 1490 operates as a protected area accessible to the processor 1452 for secure execution of instructions and secure access to data. Various implementations of the TEE 1490, and an accompanying secure area in the processor 1452 or the memory 1454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1450 through the TEE 1490 and the processor 1452.

Software Distribution Embodiments

Figure 15:
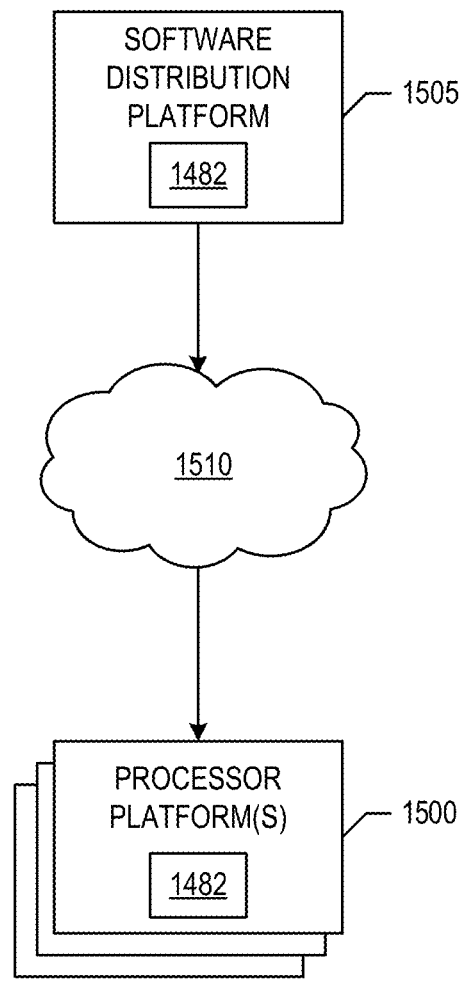
FIG. 15 illustrates an example software distribution platform to distribute software in accordance with certain embodiments.

FIG. 15 illustrates an example software distribution platform 1505 to distribute software, such as the example computer readable instructions 1482 of FIG. 14B, to one or more devices, such as example processor platform(s) 1500 and/or example connected edge devices described throughout this disclosure. The example software distribution platform 1505 may be implemented by any computer server, data facility, cloud service, etc., capable of storing and transmitting software to other computing devices (e.g., third parties, example connected edge devices described throughout this disclosure). Example connected edge devices may be customers, clients, managing devices (e.g., servers), third parties (e.g., customers of an entity owning and/or operating the software distribution platform 1505). Example connected edge devices may operate in commercial and/or home automation environments. In some examples, a third party is a developer, a seller, and/or a licensor of software such as the example computer readable instructions 1482 of FIG. 14B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 15, the software distribution platform 1505 includes one or more servers and one or more storage devices. The storage devices store the computer readable instructions 1482, which may implement the video processing functionality described throughout this disclosure. The one or more servers of the example software distribution platform 1505 are in communication with a network 1510, which may correspond to any one or more of the Internet and/or any of the example networks described throughout this disclosure. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1482 from the software distribution platform 1505. For example, software comprising the computer readable instructions 1482 may be downloaded to the example processor platform(s) 1500 (e.g., example connected edge devices), which is/are to execute the computer readable instructions 1482 to implement the functionality described throughout this disclosure. In some examples, one or more servers of the software distribution platform 1505 are communicatively connected to one or more security domains and/or security devices through which requests and transmissions of the example computer readable instructions 1482 must pass. In some examples, one or more servers of the software distribution platform 1505 periodically offer, transmit, and/or force updates to the software (e.g., the example computer readable instructions 1482 of FIG. 14B) to ensure improvements, patches, updates, etc. are distributed and applied to the software at the end user devices.

EXAMPLES

Illustrative examples of the technologies described throughout this disclosure are provided below. Embodiments of these technologies may include any one or more, and any combination of, the examples described below. In some embodiments, at least one of the systems or components set forth in one or more of the preceding figures may be configured to perform one or more operations, techniques, processes, and/or methods as set forth in the following examples.

Example 1 includes a device for performing anomaly detection, comprising: interface circuitry; and processing circuitry to: receive, via the interface circuitry, a video stream captured by a camera during performance of an industrial process, wherein the video stream comprises a sequence of frames; detect, based on analyzing the sequence of frames, a degree of particle scatter that occurs during performance of the industrial process; and determine, based on the degree of particle scatter, that an anomaly occurs during performance of the industrial process.

Example 2 includes the device of Example 1, wherein: the industrial process is performed by a robot; and the processing circuitry is further to: send, via the interface circuitry, a command to cause the robot to perform an action based on occurrence of the anomaly.

Example 3 includes the device of Example 2, wherein the action comprises: aborting the industrial process; or repeating at least a portion of the industrial process.

Example 4 includes the device of any of Examples 1-3, wherein the industrial process comprises a weld operation.

Example 5 includes the device of Example 4, wherein: the anomaly comprises weld porosity; and the degree of particle scatter comprises a degree of flame scatter that occurs during performance of the weld operation.

Example 6 includes the device of Example 5, wherein the processing circuitry to determine, based on the degree of particle scatter, that the anomaly occurs during performance of the industrial process is further to: compute a scatter metric for the sequence of frames, wherein the scatter metric indicates an average degree of flame scatter detected across the sequence of frames; and determine, based on the scatter metric, that weld porosity occurs during performance of the weld operation.

Example 7 includes the device of Example 6, wherein: the scatter metric comprises a mean standard deviation metric; and the processing circuitry to compute the scatter metric for the sequence of frames is further to: compute a plurality of standard deviation metrics for the sequence of frames, wherein each standard deviation metric indicates a standard deviation of centroids of connected components detected within a corresponding frame in the sequence of frames; and compute, based on the plurality of standard deviation metrics, the mean standard deviation metric, wherein the mean standard deviation metric indicates an average of the plurality of standard deviation metrics.

Example 8 includes the device of Example 7, wherein the processing circuitry to compute the plurality of standard deviation metrics for the sequence of frames is further to: for each frame in the sequence of frames: binarize the frame into a binarized frame; detect edges in the binarized frame; detect the connected components corresponding to the edges; and compute a standard deviation metric for the frame, wherein the standard deviation metric indicates the standard deviation of the centroids of the connected components.

Example 9 includes the device of Example 7, wherein the processing circuitry to determine, based on the scatter metric, that weld porosity occurs during performance of the weld operation is further to: determine that one or more of the plurality of standard deviation metrics exceed the mean standard deviation metric by a particular threshold.

Example 10 includes at least one non-transitory computer-readable storage medium having instructions stored thereon, wherein the instructions, when executed on processing circuitry, cause the processing circuitry to: receive, via interface circuitry, a video stream captured by a camera during performance of an industrial process, wherein the video stream comprises a sequence of frames; detect, based on analyzing the sequence of frames, a degree of particle scatter that occurs during performance of the industrial process; and determine, based on the degree of particle scatter, that an anomaly occurs during performance of the industrial process.

Example 11 includes the storage medium of Example 10, wherein: the industrial process is performed by a robot; and the instructions further cause the processing circuitry to: send, via the interface circuitry, a command to cause the robot to perform an action based on occurrence of the anomaly.

Example 12 includes the storage medium of Example 11, wherein the action comprises: aborting the industrial process; or repeating at least a portion of the industrial process.

Example 13 includes the storage medium of any of Examples 10-12, wherein the industrial process comprises a fabrication process.

Example 14 includes the storage medium of any of Examples 10-13, wherein the industrial process comprises a weld operation.

Example 15 includes the storage medium of Example 14, wherein: the anomaly comprises weld porosity; and the degree of particle scatter comprises a degree of flame scatter that occurs during performance of the weld operation.

Example 16 includes the storage medium of Example 15, wherein the instructions that cause the processing circuitry to determine, based on the degree of particle scatter, that the anomaly occurs during performance of the industrial process further cause the processing circuitry to: compute a scatter metric for the sequence of frames, wherein the scatter metric indicates an average degree of flame scatter detected across the sequence of frames; and determine, based on the scatter metric, that weld porosity occurs during performance of the weld operation.

Example 17 includes the storage medium of Example 16, wherein: the scatter metric comprises a mean standard deviation metric; and the instructions that cause the processing circuitry to compute the scatter metric for the sequence of frames further cause the processing circuitry to: compute a plurality of standard deviation metrics for the sequence of frames, wherein each standard deviation metric indicates a standard deviation of centroids of connected components detected within a corresponding frame in the sequence of frames; and compute, based on the plurality of standard deviation metrics, the mean standard deviation metric, wherein the mean standard deviation metric indicates an average of the plurality of standard deviation metrics.

Example 18 includes the storage medium of Example 17, wherein the instructions that cause the processing circuitry to compute the plurality of standard deviation metrics for the sequence of frames further cause the processing circuitry to: for each frame in the sequence of frames: binarize the frame into a binarized frame; detect edges in the binarized frame; detect the connected components corresponding to the edges; and compute a standard deviation metric for the frame, wherein the standard deviation metric indicates the standard deviation of the centroids of the connected components.

Example 19 includes the storage medium of any of Examples 17-18, wherein the instructions that cause the processing circuitry to determine, based on the scatter metric, that weld porosity occurs during performance of the weld operation further cause the processing circuitry to: determine that one or more of the plurality of standard deviation metrics exceed the mean standard deviation metric by a particular threshold.

Example 20 includes a method of performing anomaly detection, comprising: receiving, via interface circuitry, a video stream captured by a camera during performance of an industrial process, wherein the video stream comprises a sequence of frames; detecting, based on analyzing the sequence of frames, a degree of particle scatter that occurs during performance of the industrial process; and determining, based on the degree of particle scatter, that an anomaly occurs during performance of the industrial process.

Example 21 includes the method of Example 20, wherein: the industrial process comprises a weld operation; the anomaly comprises weld porosity; and the degree of particle scatter comprises a degree of flame scatter that occurs during performance of the weld operation.

Example 22 includes the method of Example 21, wherein determining, based on the degree of particle scatter, that the anomaly occurs during performance of the industrial process comprises: computing a scatter metric for the sequence of frames, wherein the scatter metric indicates an average degree of flame scatter detected across the sequence of frames; and determining, based on the scatter metric, that weld porosity occurs during performance of the weld operation.

Example 23 includes the method of Example 22, wherein: the scatter metric comprises a mean standard deviation metric; computing the scatter metric for the sequence of frames comprises: computing a plurality of standard deviation metrics for the sequence of frames, wherein each standard deviation metric indicates a standard deviation of centroids of connected components detected within a corresponding frame in the sequence of frames; and computing, based on the plurality of standard deviation metrics, the mean standard deviation metric, wherein the mean standard deviation metric indicates an average of the plurality of standard deviation metrics; and determining, based on the scatter metric, that weld porosity occurs during performance of the weld operation comprises: determining that one or more of the plurality of standard deviation metrics exceed the mean standard deviation metric by a particular threshold.

Example 24 includes a system, comprising: interface circuitry; a robot controller to control a robot, wherein the robot is to perform an industrial process; and processing circuitry to: receive, via the interface circuitry, a video stream captured by a camera during performance of the industrial process, wherein the video stream comprises a sequence of frames; detect, based on analyzing the sequence of frames, a degree of particle scatter that occurs during performance of the industrial process; determine, based on the degree of particle scatter, that an anomaly occurs during performance of the industrial process; and send a command to the robot controller to cause the robot to perform an action based on occurrence of the anomaly.

Example 25 includes the system of Example 24, wherein the action comprises: aborting the industrial process; or repeating at least a portion of the industrial process.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A device comprising:
    interface circuitry; and
    processing circuitry to:
        receive, via the interface circuitry, a video stream captured by a camera during performance of a weld operation, wherein the video stream comprises a sequence of frames, and wherein the weld operation is performed by a robot;
        detect, based on analyzing the sequence of frames, a degree of particle scatter that occurs during performance of the weld operation;
        determine, based on the degree of particle scatter, whether weld porosity occurs during performance of the weld operation; and
        upon determining that weld porosity occurs during performance of the weld operation, send, via the interface circuitry, a command to cause the robot to perform an action based on occurrence of weld porosity.

2. The device of claim 1, wherein the action comprises: aborting the weld operation; or repeating at least a portion of the weld operation.

3. The device of claim 1, wherein:
    the degree of particle scatter comprises a degree of flame scatter that occurs during performance of the weld operation.

4. The device of claim 3, wherein the processing circuitry to determine, based on the degree of particle scatter, whether weld porosity occurs during performance of the weld operation is further to:
    compute a scatter metric for the sequence of frames, wherein the scatter metric indicates an average degree of flame scatter detected across the sequence of frames; and
    determine, based on the scatter metric, whether weld porosity occurs during performance of the weld operation.

5. The device of claim 4, wherein:
    the scatter metric comprises a mean standard deviation metric; and
    the processing circuitry to compute the scatter metric for the sequence of frames is further to:
        compute a plurality of standard deviation metrics for the sequence of frames, wherein each standard deviation metric indicates a standard deviation of centroids of connected components detected within a corresponding frame in the sequence of frames; and
        compute, based on the plurality of standard deviation metrics, the mean standard deviation metric, wherein the mean standard deviation metric indicates an average of the plurality of standard deviation metrics.

6. The device of claim 5, wherein the processing circuitry to compute the plurality of standard deviation metrics for the sequence of frames is further to:
    for each frame in the sequence of frames:
        binarize the frame into a binarized frame;
        detect edges in the binarized frame;
        detect the connected components corresponding to the edges; and
        compute a standard deviation metric for the frame, wherein the standard deviation metric indicates the standard deviation of the centroids of the connected components.

7. The device of claim 5, wherein the processing circuitry to determine, based on the scatter metric, whether weld porosity occurs during performance of the weld operation is further to:
    determine whether one or more of the plurality of standard deviation metrics exceed the mean standard deviation metric by a particular threshold.

8. At least one non-transitory computer-readable storage medium having instructions stored thereon, wherein the instructions, when executed on processing circuitry, cause the processing circuitry to:
    receive, via interface circuitry, a video stream captured by a camera during performance of a weld operation, wherein the video stream comprises a sequence of frames, and wherein the weld operation is performed by a robot;
    detect, based on analyzing the sequence of frames, a level of particle scatter that occurs during performance of the weld operation;
    determine, based on the level of particle scatter, whether weld porosity occurs during performance of the weld operation; and
    upon determining that weld porosity occurs during performance of the weld operation, send, via the interface circuitry, a command to cause the robot to perform an action based on occurrence of weld porosity.

9. The storage medium of claim 8, wherein the action comprises:
aborting the weld operation; or
repeating at least a portion of the weld operation.

10. The storage medium of claim 8, wherein the weld operation is part of a fabrication process.

11. The storage medium of claim 8, wherein:
the level of particle scatter comprises a level of flame scatter that occurs during performance of the weld operation.

12. The storage medium of claim 11, wherein the instructions that cause the processing circuitry to determine, based on the level of particle scatter, whether weld porosity occurs during performance of the weld operation further cause the processing circuitry to:
compute a scatter metric for the sequence of frames, wherein the scatter metric indicates an average level of flame scatter detected across the sequence of frames; and
determine, based on the scatter metric, whether weld porosity occurs during performance of the weld operation.

13. The storage medium of claim 12, wherein:
the scatter metric comprises a mean standard deviation metric; and
the instructions that cause the processing circuitry to compute the scatter metric for the sequence of frames further cause the processing circuitry to:
compute a plurality of standard deviation metrics for the sequence of frames, wherein each standard deviation metric indicates a standard deviation of centroids of connected components detected within a corresponding frame in the sequence of frames; and
compute, based on the plurality of standard deviation metrics, the mean standard deviation metric, wherein the mean standard deviation metric indicates an average of the plurality of standard deviation metrics.

14. The storage medium of claim 13, wherein the instructions that cause the processing circuitry to compute the plurality of standard deviation metrics for the sequence of frames further cause the processing circuitry to:
for each frame in the sequence of frames:
binarize the frame into a binarized frame;
detect edges in the binarized frame;
detect the connected components corresponding to the edges; and
compute a standard deviation metric for the frame, wherein the standard deviation metric indicates the standard deviation of the centroids of the connected components.

15. The storage medium of claim 13, wherein the instructions that cause the processing circuitry to determine, based on the scatter metric, whether weld porosity occurs during performance of the weld operation further cause the processing circuitry to:
determine whether one or more of the plurality of standard deviation metrics exceed the mean standard deviation metric by a particular threshold.

16. A method, comprising:
receiving, via interface circuitry, a video stream captured by a camera during performance of a weld operation, wherein the video stream comprises a sequence of frames, and wherein the weld operation is performed by a robot;
detecting, based on analyzing the sequence of frames, a degree of particle scatter that occurs during performance of the weld operation;
determining, based on the degree of particle scatter, whether weld porosity occurs during performance of the weld operation; and
upon determining that weld porosity occurs during performance of the weld operation, sending, via the interface circuitry, a command to cause the robot to perform an action based on occurrence of weld porosity.

17. The method of claim 16, wherein:
the degree of particle scatter comprises a degree of flame scatter that occurs during performance of the weld operation.

18. The method of claim 17, wherein determining, based on the degree of particle scatter, whether weld porosity occurs during performance of the weld operation comprises:
computing a scatter metric for the sequence of frames, wherein the scatter metric indicates an average degree of flame scatter detected across the sequence of frames; and
determining, based on the scatter metric, whether weld porosity occurs during performance of the weld operation.

19. The method of claim 18, wherein:
the scatter metric comprises a mean standard deviation metric;
computing the scatter metric for the sequence of frames comprises:
computing a plurality of standard deviation metrics for the sequence of frames, wherein each standard deviation metric indicates a standard deviation of centroids of connected components detected within a corresponding frame in the sequence of frames; and
computing, based on the plurality of standard deviation metrics, the mean standard deviation metric, wherein the mean standard deviation metric indicates an average of the plurality of standard deviation metrics; and
determining, based on the scatter metric, whether weld porosity occurs during performance of the weld operation comprises:
determining whether one or more of the plurality of standard deviation metrics exceed the mean standard deviation metric by a particular threshold.

20. A system, comprising:
interface circuitry;
a robot controller to control a robot, wherein the robot is to perform a weld operation; and
processing circuitry to:
receive, via the interface circuitry, a video stream captured by a camera during performance of the weld operation, wherein the video stream comprises a sequence of frames;
detect, based on analyzing the sequence of frames, particle scatter that occurs during performance of the weld operation;
determine, based on an extent of the particle scatter, that weld porosity occurs during performance of the weld operation; and
send a command to the robot controller to cause the robot to perform an action based on occurrence of weld porosity.

21. The system of claim 20, wherein the action comprises:
aborting the weld operation; or
repeating at least a portion of the weld operation.

\* \* \* \* \*